United States Patent
Murrell et al.

(10) Patent No.: US 6,667,017 B2
(45) Date of Patent: Dec. 23, 2003

(54) PROCESS FOR REMOVING ENVIRONMENTALLY HARMFUL COMPOUNDS

(75) Inventors: Lawrence L. Murrell, South Plainfield, NJ (US); Rudolf Overbeek, Bergentheim (NL); Robert E. Trubac, Bloomfield, NJ (US); Pieter Lusse, Bloomfield, NJ (US); Balachandran Ramachandran, Bethlehem, PA (US)

(73) Assignee: ABB Lummus Global, Inc., Bloomfield, NJ (US)

(*) Notice: Subject to any disclaimer, the term of this patent is extended or adjusted under 35 U.S.C. 154(b) by 94 days.

(21) Appl. No.: 09/957,925

(22) Filed: Sep. 21, 2001

(65) Prior Publication Data

US 2002/0141912 A1 Oct. 3, 2002

Related U.S. Application Data

(60) Provisional application No. 60/234,586, filed on Sep. 22, 2000.

(51) Int. Cl.$^7$ .................................................. B01J 8/00
(52) U.S. Cl. ................ 423/210; 423/239.1; 423/240 R; 423/244.02; 423/245.1
(58) Field of Search ............................. 423/210, 239.1, 423/240 R, 245.1, 244.02

(56) References Cited

U.S. PATENT DOCUMENTS

| | | |
|---|---|---|
| 2,627,531 A | 2/1953 | Vogt |
| 4,027,476 A | 6/1977 | Schmidt ............ 60/218 |

(List continued on next page.)

FOREIGN PATENT DOCUMENTS

| | | |
|---|---|---|
| CN | 258290 | 9/1995 |
| CN | 957-21-1126-4 | 9/1995 |

(List continued on next page.)

OTHER PUBLICATIONS

Christopher J. Marrion et al, *Composite fiber structures for catalysts and electrodes*, Journal of Power Sources, 47 (1994) 297–302.

*Primary Examiner*—Stanley S. Silverman
*Assistant Examiner*—Maribel Medina
(74) *Attorney, Agent, or Firm*—Carella Byrne Bain Gilfillan et al.; Elliot M. Olstein; William Squire

(57) ABSTRACT

A process for oxidizing environmentally harmful compounds which participate in atmospheric photochemical reactions to produce for example ozone and undesirable smog constituents from a fluid, in particular a gas, volatile organic compounds (VOC) including hydrocarbons, CO and any other constituent that participates in atmospheric photochemical reactions to produce for example ozone or smog constituents and combustible compounds to be removed from a gas stream for reasons of toxicity, photochemical reactivity or physical discomfort such as irritants, particulates, odor sources and so on, and compounds which may cause upper atmosphere ozone depletion or lower atmosphere ozone formation. The uncoated randomly oriented mesh-like structure preferably has a porosity greater than about 85%. The coated randomly oriented mesh-like structure preferably has a porosity greater than about 65%. Preferred embodiments of structured packing and monoliths are disclosed each having a catalyst for oxidizing the volatile organic compound(s). In the disclosed embodiments, corrugated mesh-like sheets are arranged in mirror image angular relative orientations relative to the input gas flow direction in a range of angles from about 30° to about 80°. In a further embodiment, the corrugated sheets are in series with a monolith structure with the corrugated sheets initially receiving the fluid with the environmentally harmful compounds to be oxidized and which fluid then flows into the monolith structure to complete the oxidation. In other embodiments, the mesh-like structure may have different configurations.

8 Claims, 16 Drawing Sheets

U.S. PATENT DOCUMENTS

| | | | | |
|---|---|---|---|---|
| 4,038,214 | A | 7/1977 | Gotoh et al. | 252/458 |
| 4,113,660 | A | 9/1978 | Abe et al. | 252/455 |
| 4,126,560 | A | 11/1978 | Marcus et al. | 210/489 |
| 4,280,926 | A | 7/1981 | Abe et al. | 252/430 |
| 4,399,185 | A | 8/1983 | Petrow | 428/253 |
| 4,416,800 | A | 11/1983 | Abe et al. | 502/159 |
| 4,446,250 | A | 5/1984 | Niwa et al. | 502/309 |
| 4,464,482 | A | 8/1984 | Bird et al. | 502/325 |
| 4,520,124 | A | 5/1985 | Abe et al. | 502/159 |
| 4,608,361 | A | 8/1986 | Kanamori et al. | 502/232 |
| 4,762,956 | A | 8/1988 | Liu et al. | 585/259 |
| 4,902,418 | A | 2/1990 | Ziegler | 210/321.77 |
| 4,921,641 | A | 5/1990 | Lavin | 261/112.2 |
| 4,939,113 | A | 7/1990 | Tauster et al. | 502/251 |
| 4,965,243 | A | 10/1990 | Yamada et al. | 502/304 |
| 5,080,963 | A | 1/1992 | Tatarchuk et al. | 428/225 |
| 5,096,663 | A | 3/1992 | Tatarchuk | 419/11 |
| 5,102,745 | A | 4/1992 | Tatarchuk et al. | 428/605 |
| 5,162,287 | A | 11/1992 | Yoshimoto et al. | 502/439 |
| 5,165,899 | A | 11/1992 | Delaunay et al. | 422/180 |
| 5,179,061 | A | 1/1993 | Haerle | 502/339 |
| 5,235,102 | A | 8/1993 | Palmer et al. | 562/607 |
| 5,266,546 | A | 11/1993 | Hearn | 502/300 |
| 5,304,330 | A | 4/1994 | Tatarchuk et al. | 264/61 |
| 5,425,236 | A | 6/1995 | Haerle | 60/302 |
| 5,476,783 | A | 12/1995 | Mutsakis et al. | 435/240.23 |
| 5,490,977 | A | 2/1996 | Wan et al. | 423/210 |
| 5,541,147 | A | 7/1996 | Friedlander et al. | 502/100 |
| 5,582,810 | A | 12/1996 | Tretjak | 423/239.2 |
| 5,587,136 | A | 12/1996 | Ikeyama et al. | 423/239.1 |
| 5,651,946 | A | 7/1997 | Dekumbis et al. | 422/180 |
| 5,665,321 | A | 9/1997 | Campbell et al. | 423/210 |
| H1682 | H | 10/1997 | Brown et al. | 205/509 |
| 5,753,583 | A | 5/1998 | Heineke et al. | 502/326 |
| 5,762,885 | A | 6/1998 | Debbage et al. | 422/171 |
| 5,795,456 | A | 8/1998 | Friedman et al. | 204/471 |
| 5,800,790 | A | 9/1998 | Imamura et al. | 422/174 |
| 5,997,829 | A | * 12/1999 | Sekine et al. | 423/210 |
| 5,997,830 | A | 12/1999 | Itoh et al. | 423/213.5 |
| 6,056,928 | A | 5/2000 | Fetzer et al. | 423/235 |
| 6,277,340 | B1 | 8/2001 | Paikert et al. | 422/211 |
| 6,417,376 | B1 | * 7/2002 | Yeh et al. | 549/248 |
| 6,534,022 | B1 | 3/2003 | Carlborg et al. | 422/180 |
| 2001/0014302 | A1 | 8/2001 | Bussche et al. | 423/239.1 |

FOREIGN PATENT DOCUMENTS

| | | | |
|---|---|---|---|
| DE | 3923094 A1 | 1/1991 | |
| DE | 4206812 A1 | 9/1992 | |
| DE | 198 05 444 | 8/1999 | |
| EP | 0305203 A3 | 3/1989 | |
| EP | 0305203 A2 | 3/1989 | |
| EP | 0327279 | 8/1989 | |
| EP | 0 441 062 A | 8/1991 | |
| EP | O 574 012 | 12/1993 | |
| EP | 0903476 A1 | 3/1999 | F01N/3/02 |
| FR | 2637060 | 3/1990 | |
| FR | 2637060 | 3/1999 | |
| WO | WO 95/35152 | 12/1995 | |
| WO | WO96/37288 | 11/1996 | |
| WO | WO99/15715 | 4/1999 | |
| WO | WO00/53904 | 9/2000 | |

* cited by examiner a = CORRUGATION HEIGHT
b = PITCH LENGTH

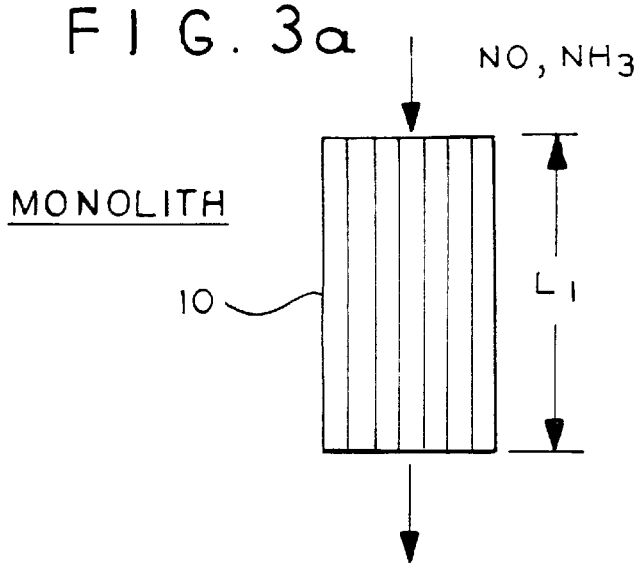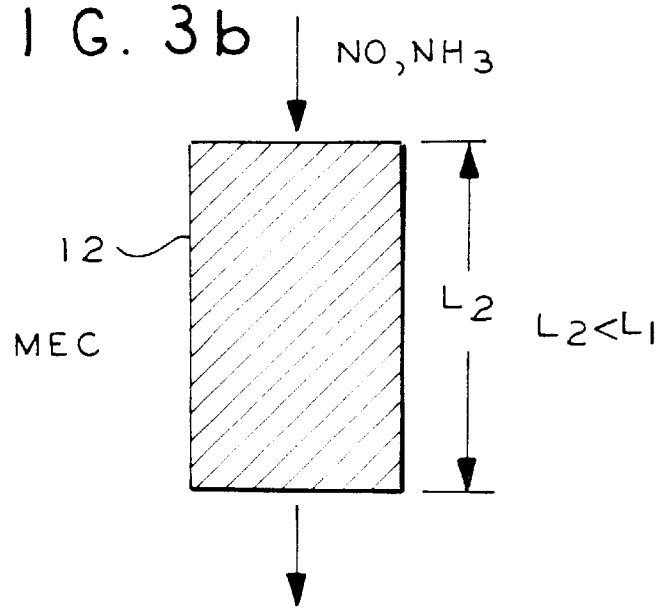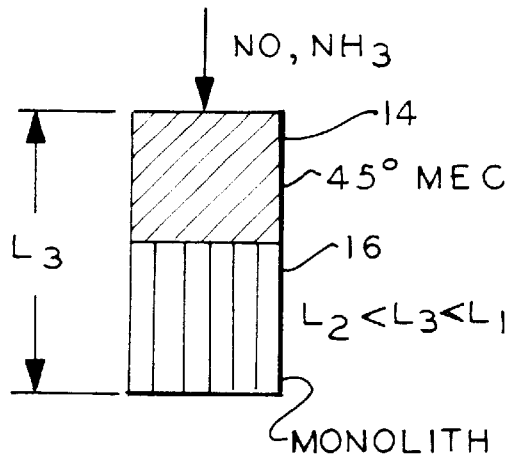

FIG. 6
FIG. 7
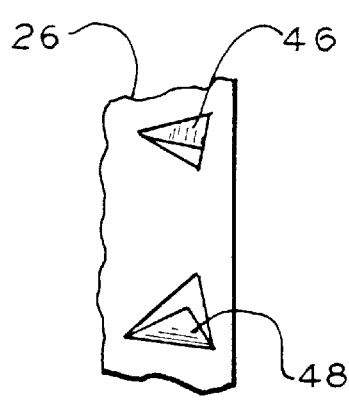
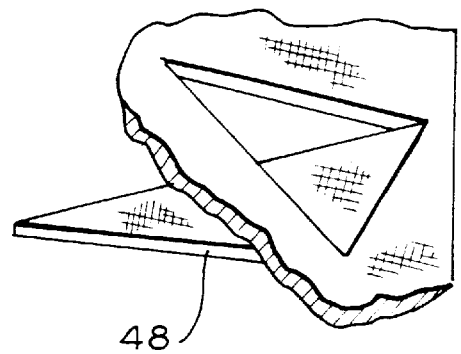
FIG. 8
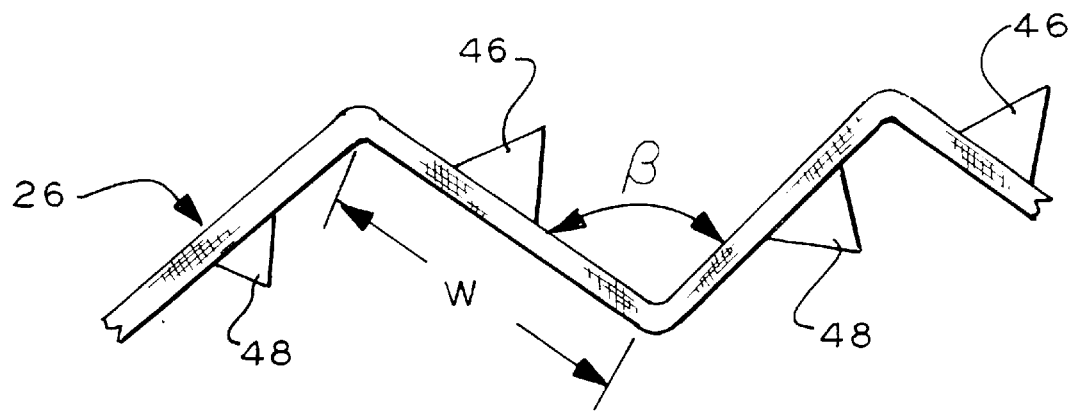

F I G. 12
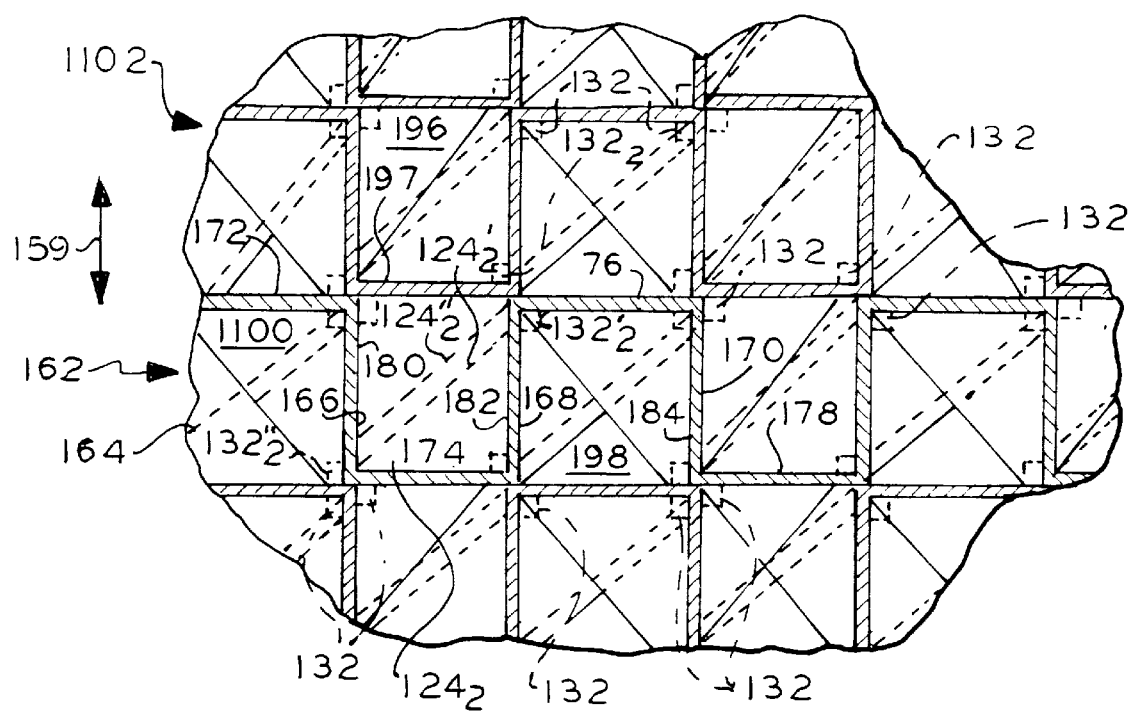

PROCESS FOR REMOVING ENVIRONMENTALLY HARMFUL COMPOUNDS

This application claims priority on provisional application Ser. No. 60/234,586 filed Sep. 22, 2000.

This invention relates to a method and apparatus for the catalytic oxidation of environmentally harmful compounds, CO and other compounds that are environmentally harmful.

CROSS REFERENCE TO RELATED APPLICATIONS

Of interest are commonly owned copending U.S. applications Ser. No. 60/222,261 entitled Conversion of Nitrogen Oxides in the Presence of a Catalyst Supported on a Mesh-like Structure filed Jul. 31, 2000 in the name of Joakim A. Carlborg et al., Ser. No. 60/159,800 entitled Conversion of Nitrogen Oxides in the Presence of a Catalyst Supported on a Mesh-like Structure filed Oct. 15, 1999 in the name of Joakim A. Carlborg et al., Ser. No. 09/181,186 entitled Method and Apparatus for Making a Catalyst Carrier Device Element filed Oct. 28, 1998 in the name of Vogt et al. and corresponding to PCT/US99/24907 filed Oct. 21, 1999; Ser. No. 09/265,164 entitled Exhaust Gas Catalytic Converter filed Mar. 9, 1999 in the name of J. Lloyd et al. and corresponding to PCT/US00/06137 filed Mar. 8, 2000; Ser. No. 09/156,023 entitled Coated Products filed Sep. 17, 1998 in the name of L. Schuh et al. and corresponding to PCT/US98/198111 filed Sep. 23, 1998; Ser. No. 09/589,817 entitled Heat Exchanger/Reactor Apparatus filed Jun. 7, 2000 in the name of Timothy Griffin et al., Ser. No. 09/322,524 entitled Structured Packing and Element Therefor filed May 28, 1999 in the name of Rudolf A. Overbeek et al. and corresponding to PCT/US99/10784 filed May 14, 1999; Ser. No. 09/002,539 entitled Structured Packing and Element Therefor filed Jan. 2, 1998 in the name of Bettina Paikert et al. corresponding to PCT/US98/27699 filed Dec. 29, 1998 all incorporated by reference herein in their entirety.

Emissions of environmentally harmful compounds, such as volatile organic compounds (VOC) are pollutants that are found in a large variety of environments. For example, such compounds may be found in painting and coating facilities, industrial and domestic kitchen broilers and stoves in the form of emitted smoke, the combustion products of stationary diesel and gasoline engines, processed wood products, printing facilities, and numerous other large and small scale industrial applications. In the semiconductor industry, for example, such compounds are found in isopropanol and decomposition of photoresists among others, in wood manufacturing such products are found in formaldehyde, terpenes and pinenes, in paper processing, alcohols, resin monomers and organic phosphates are present, in phthalic/maleic anhydride manufacturing, organic acids such as phthalic, maleic and benzoic need to be dealt with, in the petroleum industry gasoline vapor is present and in dry cleaning processes halogenated alkanes are involved. Thus volatile organic compounds are undesired by-products found in the above and other facilities and pollute the atmosphere including affecting atmospheric ozone. In addition, as part of the above processes, other compounds such as CO, hydrocarbons and other environmentally harmful compounds are emitted.

U.S. Pat. No. 5,643,545 incorporated by reference herein provides a more general definition of volatile organic compounds. Methods for the catalytic oxidation of organic compounds are well known and various prior art relating to this subject matter are described in the aforementioned U.S. Pat. No. 5,643,545. This patent describes VOCs as compounds with sufficiently high vapor pressure to exist as a vapor in ambient air and which react in the atmosphere with nitrogen oxides in the presence of heat and sunlight to form ozone, and include both halogenated and non-halogenated volatile organic compounds.

U.S. Pat. No. 4,416,800 discloses a method for producing a catalytic material. The support material has the shape of a fibrous sheet consisting of non-metallic inorganic fibers mixed with a catalyst carrier powder. The product can be further treated by impregnation in slurry or solution containing carrier materials and catalytically active agents. The catalytic material can be used for:

a) reduction of nitrogen oxides in the presence of ammonia (catalyst: Cu, Fe, V, W and Mo on $Al_2O_3$ or $TiO_2$)

b) oxidation of carbon monoxide and hydrocarbons (catalyst: Pt on $Al_2O_3$ or $TiO_2$)

Other US Patents of interest relating to reactors and catalytic converters including metal-ceramic combusters, converters for treating gases to remove pollutants, ordered catalyst bed packings, catalyst supports and fluid treatment devices and fixed bed reactors, include U.S. Pat. Nos. 5,026,273, 4,942,020, 4,471,014, 4,330,436, 3,949,109, and in addition, U.S. Pat. No. 5,653,949 (oxidation catalyst for controlling VOC), U.S. Pat. No. 5,650,128 (method of destruction of VOC flows of varying concentration), U.S. Pat. No. 5,478,530 (hot mix asphalt plant with catalytic reactor), and U.S. Pat. No. 5,375,562 (catalytic incineration system).

A process for removing environmentally harmful compounds from a fluid, in particular a gas, according to the present invention comprises forming a substrate comprising a randomly oriented mesh-like fibrous porous material having opposing sides, the material for promoting contact between fluids flowing over the surfaces of the material at the opposing sides, the material having pores exhibiting a range of sizes from sub-micron to no greater than about 500 microns, the pores having a plurality of interstices in communication with each other and externally the material, the material being arranged to create turbulence in the fluid flowing adjacent to the sides which turbulence creates a pressure differential across the material for promoting the flow of the flowing fluid from one side to the other side through the pores and interstices essentially over the entire surface of the material; and oxidizing the environmentally harmful compounds in the fluid in the presence of an oxidizing catalyst supported on the material, the catalyzed mesh-like structure having a porosity of greater than about 65%.

An apparatus for removing environmentally harmful compounds from a fluid flowing into the apparatus in a given direction in accordance with a further aspect of the present invention comprises a packing structure formed of a ceramic fibrous mesh-like porous structure having a porosity of greater than about 85% and having opposing sides, the material having pores exhibiting a range of sizes from sub-micron to no greater than about 500 microns, the pores forming a plurality of interstices in communication with each other and externally the material, the material being arranged to create turbulence in the fluid flowing at the sides which turbulence creates a pressure differential across the material for promoting the flow of the flowing fluid from one side to the other side through the pores and interstices essentially over the entire surface of the material for promoting contact between fluids flowing over the surfaces of the material at the opposing sides; and including a catalyst coated on the packing structure for oxidizing the environmentally harmful compounds in the fluid in contact with and flowing through the pores of the structure.

In a further aspect the mesh-like structure has a porosity of greater than 90%.

In a still further aspect, the environmentally harmful compounds are volatile organic compounds (VOC) including hydrocarbons, CO and any other constituent that participates in atmospheric photochemical reactions to produce for example ozone or smog constituents, combustible compounds to be removed from a gas stream for reasons of toxicity, photochemical reactivity or physical discomfort such as irritants, particulates, odor sources, compounds which may cause upper atmosphere ozone depletion or lower atmosphere ozone formation and any organic compound which participates in atmospheric photochemical reactions excluding carbon dioxide, carbonic acid, metallic carbides or carbonates, and ammonium carbonate.

In a further aspect, the mesh-like structure or packing material is formed of fibers made of metal or ceramic.

In a further aspect, the catalyst is coated on the mesh-like structure and preferably the coating thickness is less than 30 microns.

In a further aspect, the environmentally harmful compounds are any compound of carbon, excluding carbon dioxide, carbonic acid, metallic carbides or carbonates, and ammonium carbonate, which participate in atmospheric photochemical reactions.

Preferably the packing structure comprises corrugated sheets each having a plurality of parallel corrugations, the corrugations of adjacent sheets being oriented at an angle relative to the given flow direction.

In a further aspect, the packing structure comprises adjacent corrugated sheets., each sheet with parallel corrugations, the corrugations of adjacent sheets at a respective angle $\alpha$, $\alpha'$ to the given direction.

Preferably the angle $\alpha$, $\alpha'$ is in the range of about 30° to about 80°.

IN THE DRAWING

FIGS. 3a, 3b and 3c are diagrammatic view of different combinations of packing elements showing dimensional relationship between the different combinations to obtain a given catalytic result;

FIG. 6 is a more detailed view of the element of FIG. 5 taken at region 6;

FIG. 7 is a more detailed view one of the vortex generators of FIG. 6 taken at region 7;

FIG. 8 is an end view of a portion of the packing element of FIG. 5;

FIG. 12a is a more detailed view of a portion of the structure of FIG. 11;

Figure 1:
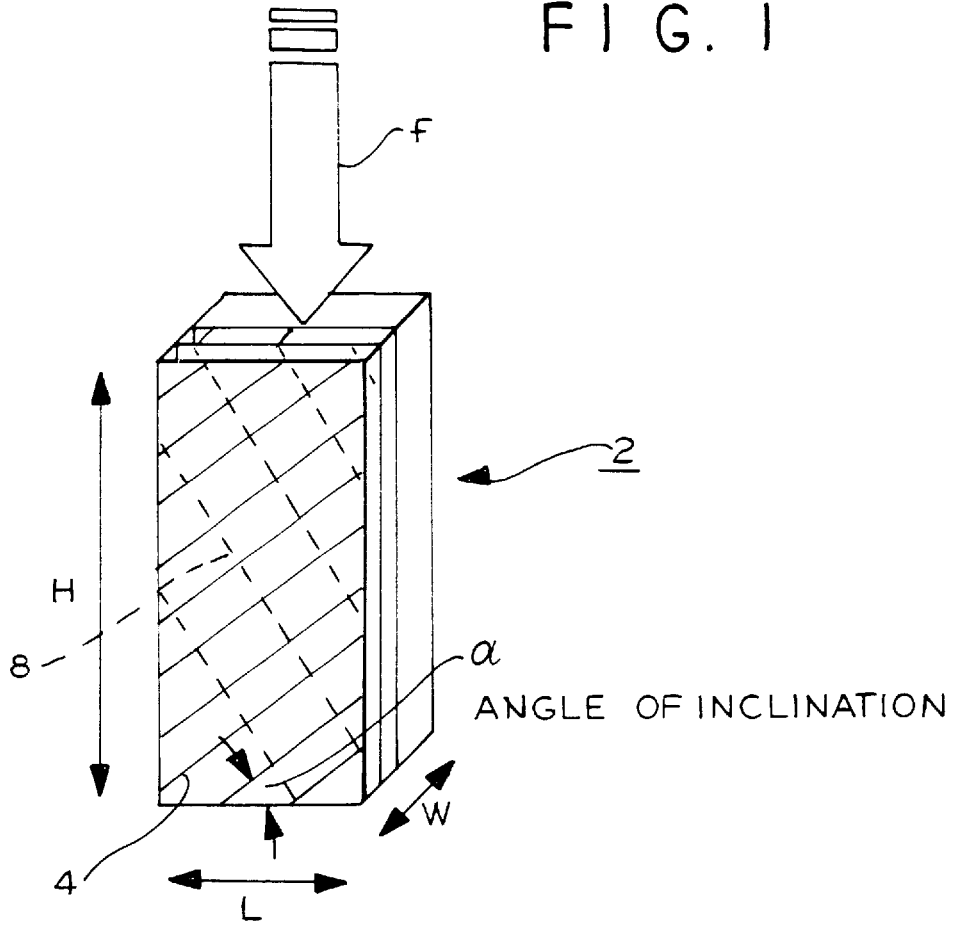
FIG. 1 is an isometric diagrammatic view of a packing structure useful for explaining the principles of the present invention.

The term "removing or conversion of environmentally harmful compounds," as used herein, means that the environmentally harmful compounds are reacted, i.e., oxidized, with a molecule(s) of a catalyst, e.g., $\gamma$-alumina impregnated with platinum, to produce $CO_2$, and $H_2O$.

The term environmentally harmful compounds as employed herein and in the claims includes volatile organic compounds (VOC) including hydrocarbons, CO and any other constituent that participates in atmospheric photochemical reactions to produce for example ozone or smog constituents. The term also includes combustible compounds to be removed from a gas stream for reasons of toxicity, photochemical reactivity or physical discomfort such as irritants, particulates, odor sources and so on, and compounds which may cause upper atmosphere ozone depletion or lower atmosphere ozone formation. VOC means any organic compound which participates in atmospheric photochemical reactions excluding carbon dioxide, carbonic acid, metallic carbides or carbonates, and ammonium carbonate.

The mesh-like material is comprised of fibers or wires, such as a wire or fiber mesh, a metal felt or gauze, metal fiber filter or the like. This material is also referred to herein as MEC. The mesh-like structure may be comprised of a single layer, or may include more than one layer of wires; e.g., a knitted wire structure or a woven wire structure and preferably is comprised of a plurality of layers of wires or fibers to form a three-dimensional network of materials. In a preferred embodiment, the support structure is comprised of a plurality of layers of fibers that are oriented randomly in the layers. One or more metals may be used in producing a metal mesh. Alternatively the mesh fibers may be formed entirely from or include materials other than metals, i.e., non-metals alone or in combination with metals, e.g., carbon or metal oxides or a ceramic. In some embodiments, the mesh is formed solely of metal or preferably solely of ceramic fibers.

In a preferred embodiment wherein the mesh-like MEC structure is comprised of a plurality of layers of fibers to form the three-dimensional network of materials, the thickness of such support is at least five microns, and generally does not exceed ten millimeters. In accordance with a preferred embodiment, the thickness of the network is at least 50 microns and more preferably at least 100 microns and generally does not exceed 2 millimeters.

In general, the thickness or diameter of the fibers which form the plurality of layers of fibers is less than about 500 microns, preferably less than about 150 microns and more preferably less than about 30 microns. In a preferred embodiment, the thickness or diameter of the fibers is from about 8 to about 25 microns.

The three dimensional mesh-like structure may be produced as described in U.S. Pat. Nos. 5,304,330, 5,080,962; 5,102,745 or 5,096,663 incorporated by reference in their entirety. It is to be understood, however, that such mesh-like structure may be formed by procedures other than as described in the aforementioned patents.

The mesh-like structure that is employed in the present invention (without supported catalyst on the mesh) has a porosity or void volume which is greater than 85%, and preferably greater than 87% and more preferably is greater than 90%. The term "void volume" as used herein is determined by dividing the volume of the structure which is open by the total volume of the structure (openings and mesh material) and multiplying by 100. In general the void volume does not exceed about 95%. The porosity with the catalyst supported on the mesh is preferably about 65% or greater, especially when formed of ceramic fibers.

In one embodiment, the catalyst is supported on the mesh-like material without the use of a particulate support.

In another embodiment, the catalyst for converting environmentally harmful compounds is supported on a particulate support that is supported on the mesh-like material. The term particulate as used herein includes and encompasses spherical particles, elongated particles, fibers, etc. In general, the average particle size of the particulate on which catalyst may be supported does not exceed 200 microns and is typically no greater than 50 microns with the average particle size in the majority of cases not exceeding 20 microns. In general, the average particle size of such particulates is at least 0.002 micron and more generally at least 0.5 microns. When the catalyst supported on the particulate support is coated on the mesh, the average particle size of the catalyst support generally does not exceed 10 microns and, when entrapped in the mesh, generally does not exceed 150 microns.

In an embodiment of the invention, the mesh-like MEC structure, that functions as a support for the catalyst is in the form of a shaped structured packing. This packing can be configured as described below in embodiments given by example to provide for gas phase flowing over the catalyst in the reactor. The mesh-like catalyst support structure preferably is provided with corrugations to provide turbulence as described in more detail hereinafter to create the desired pressure differential across the material to promote the flow of the flowing fluid into the mesh pores and to the opposite side of the material thereby enhancing fluid contact on both sides of the material with each other and with the catalyst within the mesh pores. Alternatively, the mesh-like structure may optionally include tabs or vortex generators to provide for increased turbulence, also as shown hereinafter. The presence of turbulence enhances mixing in the radial (and longitudinal) direction and also improves access to catalyst either coated on or entrapped in the mesh by providing local pressure differentials across the mesh, and thus creating a driving force for flow through the micro pores of the material, which pores normally resist such flow without such pressure differentials.

The structured packing can also be in the form of a module such as a roll of one or more sheets that is placed into the tubes of a reactor such that the channels in the module follow the longitudinal direction of the tube. The roll can comprise sheets that are flat, corrugated or wavy or a combination thereof and the sheets can contain fins or holes to promote mixing. The sheets can also be shaped into corrugated strips that are separated from each other by a flat sheet that exactly fit the size of a tube and are held together by welds, wires, a cylindrical flat sheet or combinations thereof.

It is to be understood that the mesh-like support that supports the catalyst may be employed in a form other than as a structured sheet. For example, the mesh-like support may be formed as rings, particles, ribbons, etc. and employed in a reactor as a packed bed.

In any case the packing structure is formed of a randomly oriented fibrous mesh-like structure having a porosity of greater than about 85%, the structure comprising porous material having opposing sides. The material promotes contact between fluids flowing over the surfaces of the material at the opposing sides. The material has pores exhibiting a range of sizes from sub micron to no greater than about 500 microns, the pores forming a plurality of interstices in communication with each other and externally the material. The material is arranged to create turbulence in the fluid flowing at the sides which turbulence creates a pressure differential across the material for promoting the flow of the flowing fluid from one side to the other side through the pores and interstices essentially over the entire surface of the material.

A catalyst is coated on the packing structure for oxidizing the environmentally harmful compounds in the fluid passing through the structure. The packing and catalyst may have a porosity of about 65% or greater.

The catalyst which is supported on the mesh-like structure may be present on the mesh-like support as a coating on the wires or fibers that form the mesh-like structure and/or may be present and retained in the interstices of the mesh-like structure.

The catalyst, or the support, with or without the catalyst, may be coated on the mesh-like structure by a variety of techniques, e.g., dipping or spraying. The catalyst particles may be applied to the mesh-like structure by contacting the mesh-like structure with a liquid coating composition (preferably in the form of a coating bath) that includes the particles dispersed in a liquid under conditions such that the coating composition enters or wicks into the mesh-like structure and forms a porous coating on both the interior and exterior portions of the mesh-like structure.

In such an embodiment, the surface tension of the metal being coated is coordinated with the viscosity and surface tension of the liquid coating composition such that the liquid coating composition is drawn in to the interior of the structure to produce a particulate coating on the mesh-like structure.

The metal to be coated preferably has a surface tension which is greater than 50 dynes/cm and preferably is higher than the surface tension of the liquid coating composition to obtain spontaneous wetting and penetration of the liquid into the interior of the mesh.

In the case where the metal of the structure that is to be coated does not have the desired surface tension, the structure may be heat-treated to produce the desired surface tension.

The liquid coating composition can be prepared without any binders or adhesives for causing adherence of the particulate coating to the structure.

The surface of the structure to be coated may also be chemically or physically modified to increase the attraction between the surface and the particles that form the coating, e.g., heat treatment or chemical modification of the surface. The surface of the structure can be modified by coating the non-catalytic support particles to improve attachment.

In one embodiment, the catalyst is coated onto the mesh by dip-coating. In a preferred embodiment, the three-dimensional mesh-like material is oxidized before coating; e.g., heating in air at a temperature of from 300° C. up to 700° C. In some cases, if the mesh-like material is contaminated with organic material, the mesh-like material is cleaned prior to oxidation; for example, by washing with an organic solvent such as acetone.

The coating bath is preferably a mixed solvent system of organic solvents and water in which the particles are dispersed. The polarity of the solvent system is preferably lower than that of water in order to prevent high solubility of the catalyst and to obtain a good quality slurry for coating. The solvent system may be a mixture of water, amides, esters, and alcohols. The kinematic viscosity of the coating bath is preferably less than 175 centistokes and the surface tension thereof is preferably less than 300 dynes/cm.

In a preferred embodiment of the invention, the mesh-like MEC structure that is coated includes metal wires or fibers and the metal wires or fibers that are coated are selected or treated in a manner such that the surface tension thereof is higher than 50 dynes/cm, as determined by the method described in "Advances in Chemistry", 43, Contact Angle, Wettability and Adhesion, American Chemical Society, 1964.

In coating a mesh-like structure that includes metal fibers, the liquid coating composition preferably has a surface tension from about 50 to 300 dynes/cm, and more preferably from about 50 to 150 dynes/cm, as measured by the capillary tube method, as described in T. C. Patton, "Paint Flow and Pigment Dispersion", $2^{nd}$ Ed., Wiley-Interscience, 1979, p. 223. At the same time, the liquid coating composition has a kinematic viscosity of no greater than 175 centistokes, as measured by a capillary viscometer and described in P. C. Hiemenz, "Principles of colloid and Surface Chemistry", $2^{nd}$ Ed., Marcel Dekker Inc., 1986, p. 182.

In such an embodiment, the viscosity and surface tension of the liquid-coating composition is coordinated with the surface tension of the metal being coated such that the liquid-coating composition is drawn into the interior of the structure to produce a particulate coating on the mesh-like structure upon drying. The metal to be coated preferably has a surface tension which is greater than 50 dynes/cm and preferably is higher than the surface tension of the liquid coating composition to obtain spontaneous wetting and penetration of the liquid into the interior of the mesh.

In the case where the metal of the structure that is to be coated does not have the desired surface tension, the structure may be heat-treated to produce the desired surface tension.

The liquid coating composition can be prepared without any binders or adhesives for causing adherence of the particulate coating to the structure.

The surface of the structure to be coated may also be chemically or physically modified to increase the attraction between the surface and the particles that form the coating; e.g., heat treatment or chemical modification of the surface.

The solids content of the coating bath generally is from about 2% to about 50%, preferably from about 5% to about 30%.

The bath may also contain additives such as surfactants, dispersants, water soluble polymers, etc. In general, the weight ratio of additives to particles in the coating bath is from 0.0001 to 0.4 and more preferably from 0.001 to 0.1.

The mesh-like material preferably is coated by dipping the mesh-like material into a coating bath one or more times while drying or calcining between dippings. The temperature of the bath is preferably at room temperature, but has to be sufficiently below the boiling point of the liquid in the bath.

After coating, the mesh-like material that includes a porous coating comprised of a plurality of particles is dried, preferably with the material in a vertical position. The drying is preferably accomplished by contact with a flowing gas (such as air) at a temperature of from 20° C. to 150° C. more preferably from 100° C. to 150° C. After drying, the coated mesh-like material is preferably calcined, for example, at a temperature of from 250° C. to 800° C., preferably 300° C. to 500° C., most preferably at about 400° C. In a preferred embodiment, the temperature and air flow are coordinated in order to produce a drying rate that does not affect adversely the catalyst coating, e.g., cracking, blocking of pores, etc. In many cases, a slower rate of drying is preferred. This slower rate of drying can be accomplished by use of a humidified drying gas. It may also be advantageous to vary the humidity of the drying gas as a function of time.

The thickness of the formed coating may vary. In general, the thickness is at least 1 micron and in general no greater than 100 microns. Typically, the coating thickness is less than 50 microns and more typically does not exceed 30 microns. Applicant has found that coating thickness of less than 30 microns enhances catalyst effectiveness and, therefore, increases volumetric activity.

The interior portion of the mesh material that is coated has a porosity which is sufficient to allow the particles which comprise the coating to penetrate or migrate into the three-dimensional network. Thus, the pore size, e.g., an average pore size of no greater than about 50 microns, of the three-dimensional material and the particle size of the particles comprising the coating, in effect, determine the amount and uniformity of the coating that can be deposited in the interior of the network of material and/or the coating thickness in the network. The larger the pore sizes the greater the thickness of the coating which can be uniformly coated.

In the case where the particles are in the form of a catalyst precursor, the product, after the deposit of the particles, is treated to convert the catalyst precursor to an active catalyst. In the case where the particles which are deposited in the three-dimensional network of material is a catalyst support, active catalyst or catalyst precursor may then be applied to such support, e.g., by spraying, dipping, or impregnation.

In using a coating bath, the coating slurry in some cases may include additives. These additives change the physical characteristics of the coating slurry, in particular the viscosity and surface tension such that during dipping the slurry penetrates the mesh, and a coating can be obtained with a homogeneous distribution on the interior and exterior of the mesh. Sols not only change the physical properties of the coating slurry, but also act as binders. After the deposition, the article is dried and calcined.

As representative stabilizing agents there may be mentioned: a polymer like polyacrylic acid, acrylamines, organic quaternary ammonium compounds, or other special mixes which are selected based on the particles. Alternatively an organic solvent can be used for the same purpose. Examples of such solvents are alcohols or liquid paraffins. Control of the pH of the slurry, for example, by addition of $HNO_3$ is another method of changing the viscosity and surface tension of the coating slurry.

The catalyst may be coated onto the mesh-like catalyst support by an electrophoretic coating procedure, as described in U.S. application Ser. No. 09/156,023, filed on Sep. 17, 1998. In such a procedure, a wire mesh-like structure is employed as one of the electrodes, and the catalyst of the requisite particle size, is suspended in a coating slurry. A potential is applied across the electrodes, one of which is the mesh-like structure formed from a plurality of layers of fibers, and the mesh-like structure is electrophoretically coated with the catalyst.

As hereinabove indicated, the supported selective oxidation catalyst may be supported on the mesh material by entrapping or retaining the particulate in the interstices of the mesh. For example, in producing a mesh-like structure comprised of a plurality of layers of randomly oriented fibers, the catalyst or a catalyst support may be included in the mix that is used for producing the mesh-like structure whereby the mesh-like structure is produced with the catalyst or catalyst support retained in the interstices of the mesh. For example, such mesh-like structures may be produced as described in the aforementioned patents, and with an appropriate catalyst or catalyst support being added to the mesh that contains the fibers and a binder, such as cellulose. The produced mesh structure includes the catalyst retained in the mesh structure.

These and other embodiments should be apparent to those skilled in the art from the teachings herein.

Although in a preferred embodiment, essentially the entire thickness of the material is coated with the catalyst, it is within the spirit and scope of the invention to coat less than the entire thickness with such particles. It also is possible within the spirit and scope of the present invention to have various coating thicknesses within the three-dimensional structure at the internal interstices of the mesh material.

Catalyst for converting environmentally harmful compounds are known in the art. Representative examples of such include, but are not limited to precious metals including platinum, palladium and rhodium. Non precious base metal catalysts may also be used. Examples of the latter include manganese, copper, iron, nickel, chromium, vanadium, cobalt and molybdenum. It is to be understood, however, that the scope of the present invention is not to be limited to the specific catalysts hereinabove described.

The catalyst is supported on the mesh-like structure in an amount effective to oxidize environmentally harmful compounds. In general, the catalyst is present in an amount of at least 5%, and preferably at least 10%, with the amount of catalyst generally not exceeding 60% and more generally not exceeding 40%, all by weight, based on mesh and catalyst. In one embodiment where the porosity or void volume of the mesh-like structure prior to adding supported catalyst is greater than 87%, the weight percent of catalyst is from about 5% to about 40%, and when the porosity or void volume is greater than 90%, the weight percent of supported catalyst is from about 5% to about 80%.

In one embodiment, the catalyst which is supported on the mesh-like structure is employed in the conversion of environmentally harmful compounds to produce $CO_2$ and water.

Given the fast temperature changes typical of mobile sources such as automotive engines, a quick reaction may be required to achieve optimum system efficiency. The use of the mesh-like structure described herein is ideal for such applications given its' superior heat transfer, low thermal mass and its' ability to be heated electrically. In addition, the use of the mesh-like structure improves catalyst effectiveness and, therefore, increases volumetric activity.

For example, hydrocarbons found in the exhaust gases of fossil fueled power plants, or in the combustion products of internal combustion engines produce $CO_2$ and water in the presence of the catalyst supported on a mesh-like structure as hereinabove described.

When used for a diesel engine, the mesh-like material that includes the catalyst for oxidizing the environmentally harmful compounds may be shaped into a honeycomb structure. In general, such reactions take place at a temperature of from about 100° C. to about 500° C., preferably from about 200° C. to about 400° C.

In this embodiment, an oxidation catalyst such as platinum, palladium, rhodium, manganese, cobalt, nickel, iron, copper, molybdenum, chromium vanadium, and so on., and in particular, platinum, supported on a transitional alumina on the mesh-like structure hereinabove described. Such a combination of the catalyst, supported on a mesh-like structure, may be employed in oxidizing environmentally harmful compounds simultaneously.

Figure 1A:
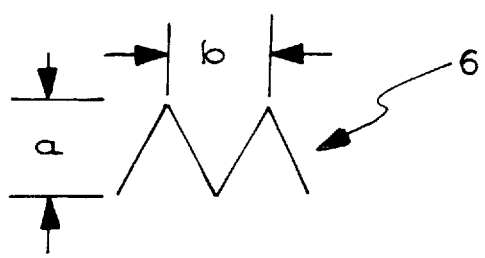
FIG. 1a is a diagram useful for explaining parameters of a corrugated packing material.

Various embodiments of structural packings will now be described. In FIG. 1, packing 2 is diagrammatically representative of a plurality of parallel corrugated sheets of porous mesh material (referred to herein also as MEC material) in which the corrugations 4 are represented by diagonal lines which are at an angle $\alpha$ to the vertical direction of flow f. FIG. 1a, a representative cross section of a corrugation 6. Adjacent corrugated sheets 8 alternate 90° from each other.

Vertical orientation of the packing relative to the flow direction f is desired to optimize the pressure drop vs. the volatile organic compound oxidation. This is best represented by a removal efficiency characterized by the term $k/\Delta p$ where k is the first order reaction rate constant and $\Delta p$ is the pressure drop. Table 1 is provided for illustrating these principles in respect of a different process involving the conversion of NO. Table 1 shows the relationship between the angle of inclination $\alpha$ and the removal efficiency for different angles of inclination and also compared to a typical honeycomb structure used for this purpose. Typical monolith honeycombs exhibit a pressure drop at a superficial velocity of 5 m/s and 350 C. of about 750 Pa/m. What is important is the degree of mixing achieved in a structure with a lower pressure drop (higher angle of inclination) which will tend to decrease while maintaining the desired oxidation. This lower pressure drop is important in power generation systems since any additional pressure loss will decrease power generating turbine efficiency.

The present invention is particularly useful in those applications where pressure losses over the catalyst system need to be very small in order to reduce bypass or, in some cases, to obstruct exhaust flow. In these processes, too mush pressure loss is harmful because there might be insufficient pressure in the inlet gas stream to drive the gas through the reactor in the presence of such a pressure loss. The efficiency (removal/pressure loss) is important since if there is insufficient pressure driving force available to force flow through the removal apparatus (the reactor), as indicated the consequence will be partial or total bypass of the removal apparatus, resulting in decreased removal and possible harm to people near the apparatus.

It is therefore critical to enhance efficiency of the oxidation reaction to such an extent that the ratio of the efficiency per pressure loss is maximized. Table 1 summarizes examples with various system configurations and its influence on, in this case, NOx reduction efficiency per pressure loss.

TABLE 1

(NO Conversion - For illustration)

|  | Honeycomb | | Corrugated Porous structure | | | |
|---|---|---|---|---|---|---|
|  |  |  | 45 deg angle | | 60 deg angle | |
| GHSV | Conv | k/Δp | Conv | k/Δp | Conv | k/Δp |
| Reaction Temperature = 300° C. | | | | | | |
| 10000 | 95.9 | 2366 | 91.8 | 3637 | 89.4 | 7377 |
| 20000 | 84.3 | 1371 | 83.9 | 1980 | 84.2 | 4680 |
| Reaction Temperature = 350° C. | | | | | | |
| 10000 | 97.7 | 2794 | 93.9 | 4067 | 92.7 | 8603 |
| 20000 | 88.7 | 1615 | 89.2 | 2414 | 87.9 | 5357 |

Table 1 shows that although there is a slight loss in conversion in going from a structure containing a 45° angle of inclination to a structure with a 60° angle, this is overshadowed by the increase in overall efficiency. The above Table also shows that the advantage of the catalyzed porous corrugated structure over the honeycomb increases with increasing GHSV. This is due to the additional benefit of better mixing at higher throughputs for the turbulence causing corrugated structure as opposed to the laminar flow regime typical of a honeycomb monolith.

Irrespective of the above, it is imperative that the pressure drop be minimized to permit the desired flow through the reactor structure. The pressure drop is determined by a number of factors including the angle of inclination of the corrugations to the input gas flow direction, the smaller the angle, the less of a pressure drop, the depth of the corrugations such as dimension a, FIG. 1a, the pitch of the corrugations, i.e., the size of the channels, the larger the channels the lower the pressure drop, the height of the overall structure, dimension L1 or L2, FIG. 3a or 3b, respectively, the smaller the height the lower the pressure drop.

It is believed that to further increase the conversion of NO, a combination of corrugated porous MEC mesh material and conventional honeycomb monolith in a vertical flow orientation may be used. This is shown in FIG. 3c. This combination may also be applicable to enviornmentally harmful compounds as well.

In FIG. 3a, a conventional monolith honeycomb structure 10 has a length of $L_1$ whereas a corrugated structure 12 using MEC mesh material of the present invention for the structure packing elements has a height of $L_2$ and $L_2 < L_1$. for a given conversion value. In FIG. 3c, the corrugated structure 14 is combined with a monolith structure 16 of generally the same construction as structures 10 and 12 except the lengths are now shorter to provide a given conversion provided by either the monolith alone of FIG. 3a or the corrugated structure of FIG. 3b. Thus improved oxidation is provided while using less corrugated structure material, thereby decreasing cost. The increase in conversion will be caused by the improved mixing of the structure creating an improved efficiency of the downstream honeycomb monolith.

Figure 2:
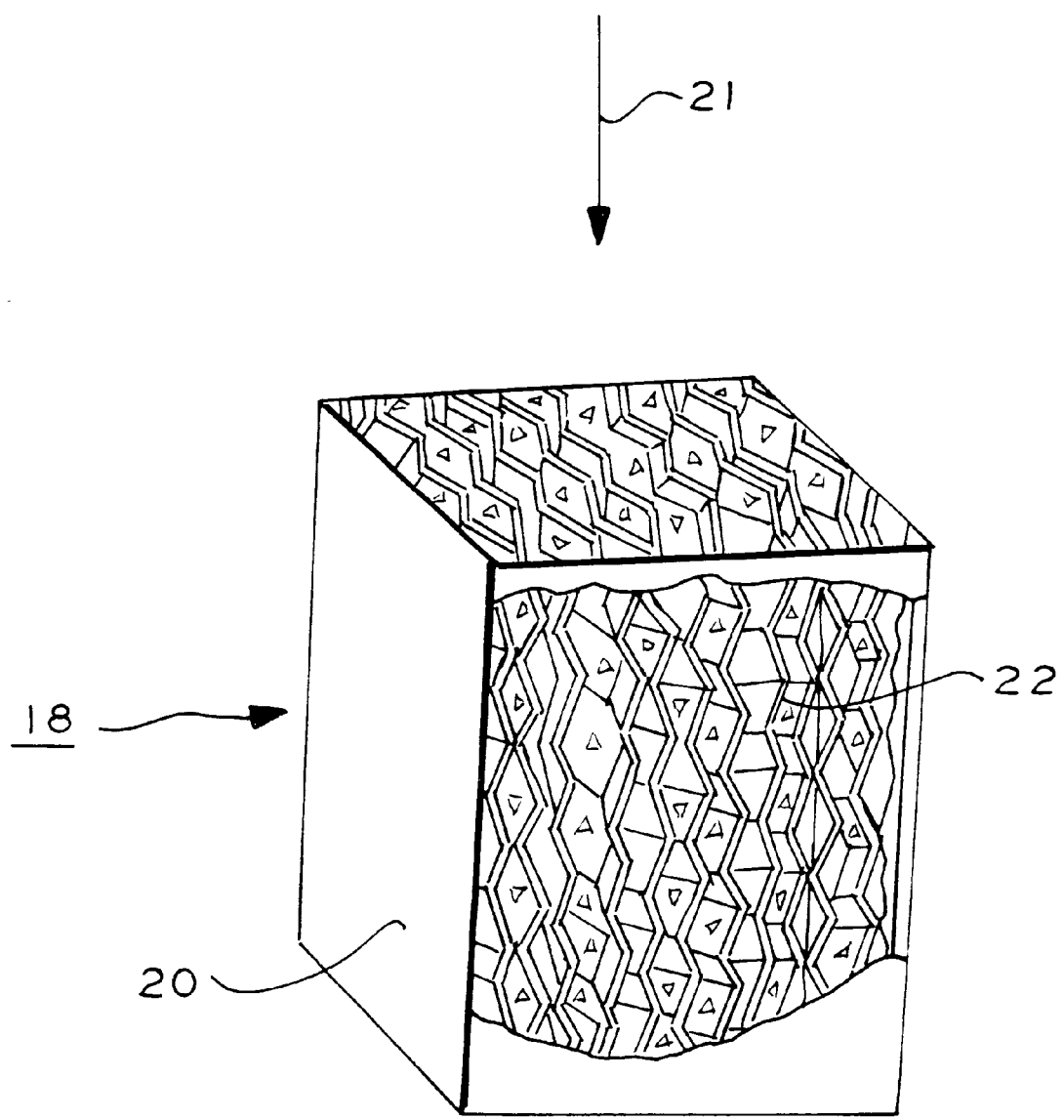
FIG. 2 is an isometric fragmented sectional view of view of a packing structure embodiment for use with the present invention.

In FIG. 2, a preferred converter structure 18 comprises a housing 20 preferably square or rectangular in cross section having a chamber in which packing 22 is located. The packing 22 comprises planar sheets of corrugated MEC porous mesh material elements as described herein above. The corrugations are parallel and otherwise the same on each sheet. The material has no vortex generators or through holes in the material other than the pores forming the void volume.

Figure 4:
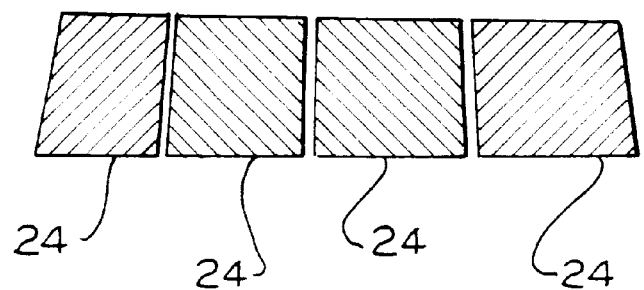
FIG. 4 is a perspective view of a plurality of corrugated packing elements of FIG. 2 laid out in side-by-side relation to show their relative corrugation orientations in the embodiment of FIG. 2.

The porous MEC material comprises a plurality of corrugated elements 24, FIG. 4, and referred to in Table I preferably at an inclination angle α of 45° or at any other suitable angle according to a given implementation. The elements 24 are in this embodiment identical but may differ according to the particular implementation. As seen in FIG. 4, the angle of inclination α of adjacent elements are mirror images of each other and alternate in this mirror image relation. No vortex generators are on the elements 24. The number of elements used depends upon the dimensions of the housing 20 and the dimensions of the corrugations and of course the sheet thickness. The angular orientation of the corrugations relative to the input gas flow direction, angle α, FIG. 1, may be in the range of about 30° to about 80°.

Figure 5:
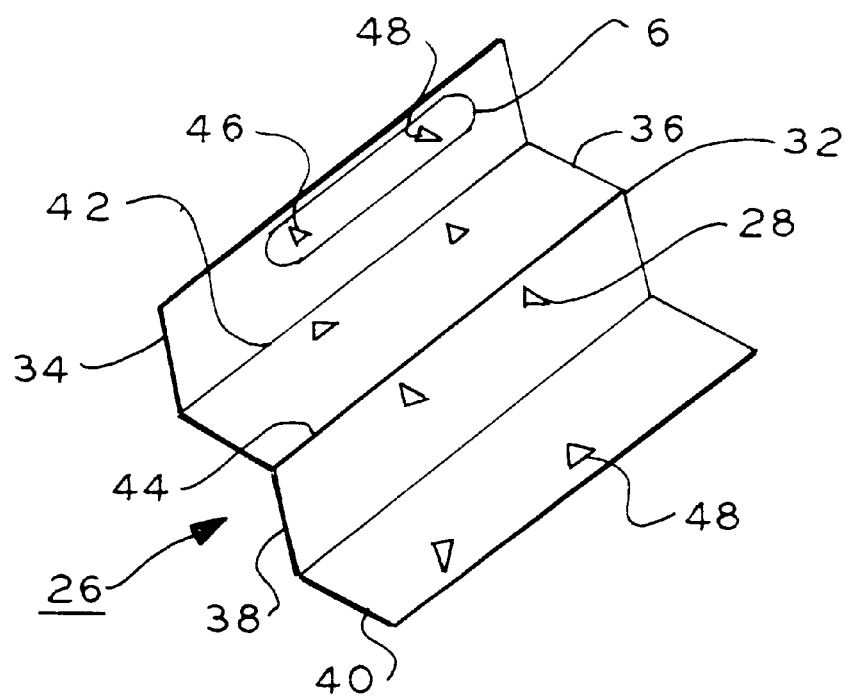
FIG. 5 is a perspective view of an alternative embodiment employing vortex generators with the corrugated elements used in the embodiment of FIGS. 2 and 4.

In FIG. 5, in the alternative, a corrugated element 26 may be used in place of the corrugated elements 24 of FIG. 4. The element 26 has optional vortex generators 28 and 30. The element 26 of FIG. 6 is fabricated in apparatuses shown and described in the aforementioned applications PCT/US00/06137; PCT/US98/27699, the former corresponding to application U.S. Ser. No. 09/181,186 and the latter corresponding to U.S. Ser. No. 09/002539 mentioned in the introductory portion herein. The latter applications provide a description of an apparatus fully incorporated by reference herein for making the elements 26 forming corrugations 32 and the vortex generators in the sheet material. The corrugations are formed by adjacent side walls 34, 36, 38, 40 and so on. The corrugations define roots 42 and crests 44. The side walls are inclined preferably at an angle β (FIG. 8) of about 90°. The roots and crests extend in a linear direction.

The elements 24, FIG. 4, are oriented with their corrugation channel axes at alternating angles to the flow direction f, FIG. 1. The corrugations form gas channels there through. These channels are in fluid communication with each other at the edges of the elements at the housing 20, FIG. 2, peripheral surface. The flow pattern angle may be at any desired value according to a given implementation as set forth in Table I above at the desired minimum pressure drop. The gas entering the housing 20 in direction 21, FIG. 2, enters into the channels of the elements and then is diverted at angle α initially then at a mirror image angle α' thereto in the adjacent element and so on alternating in mirror image angles α relative to the inlet gas direction 21 of flow. This creates a turbulence in the flow. This turbulence creates a pressure differential across the elements resulting in fluid flow through the pores of the MEC porous sheet material.

In FIGS. 6, 7 and 8, optional vortex generators 46 and 48 are triangular and bent from the plane of the element 26 sheet material. The generators 46 and 48 alternate in the direction in which they project from the plane of the sheet material as best seen in FIG. 8. The corrugations have a width w. The vortex generators provide additional turbulence and thus further promote fluid flow through the pores of the MEC material due to the pressure differential thereacross. This is discussed in more detail in the aforementioned application PCT/US99/10784 and its corresponding U.S. application Ser. No. 09/322,524 incorporated by reference herein.

Figure 9:
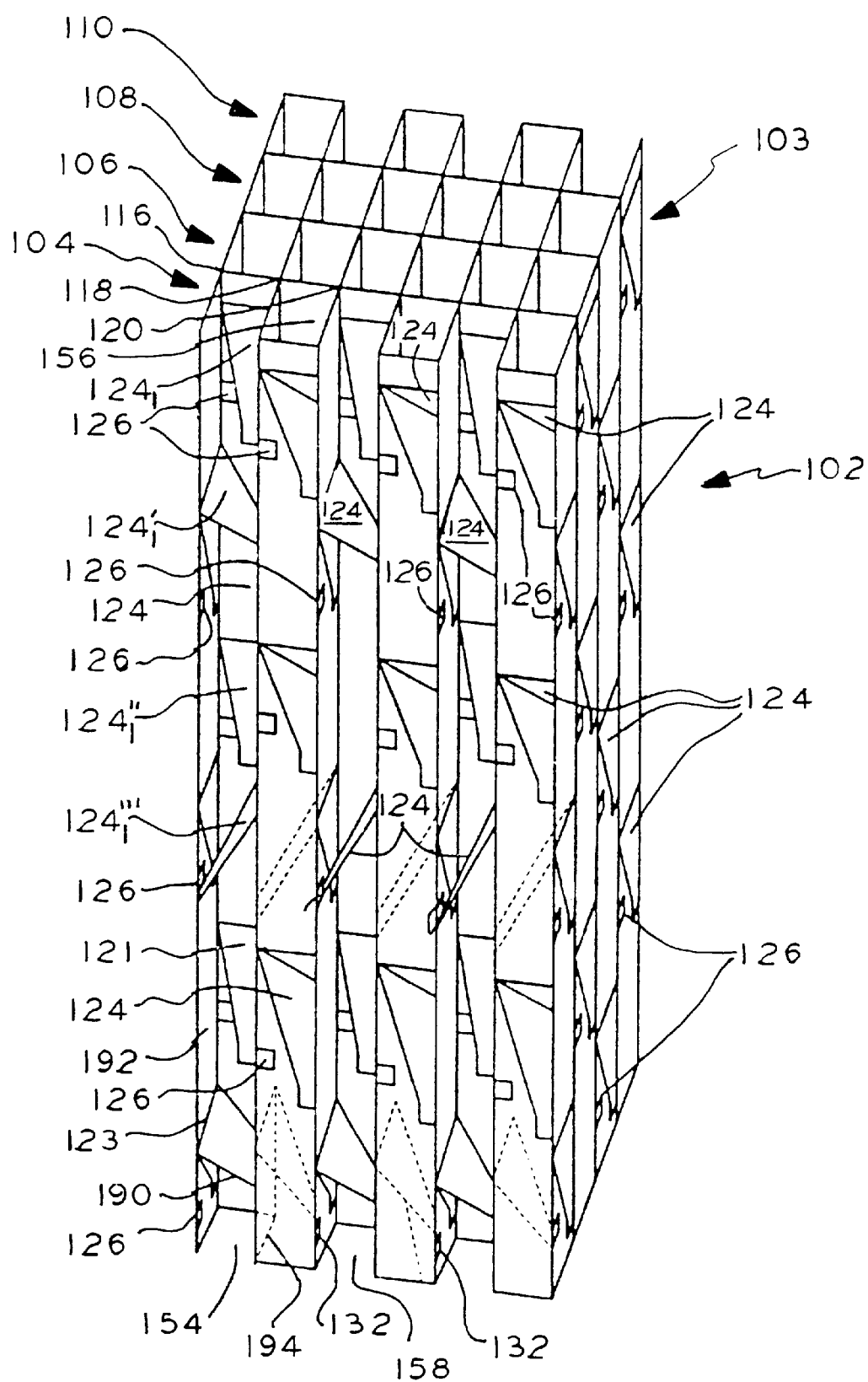
FIG. 9 is an isometric view of a second packing structure embodiment for use with the present invention.
Figure 11:
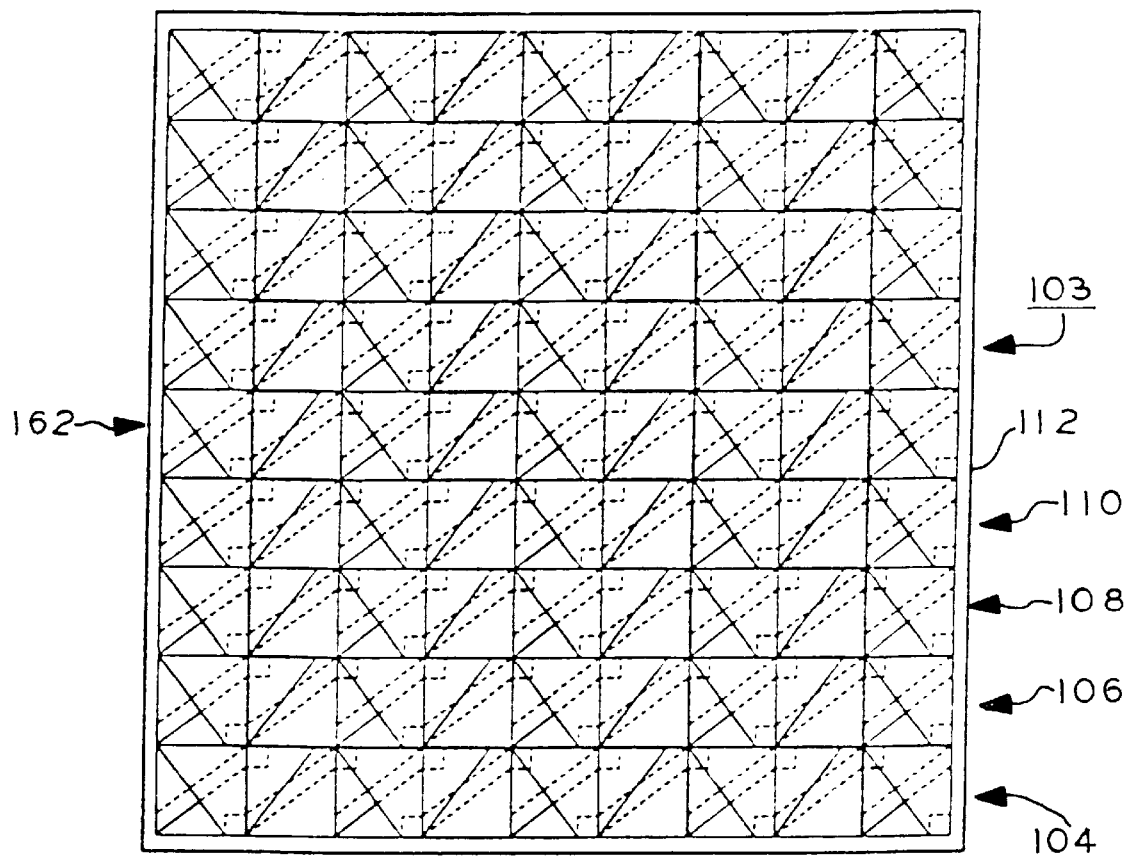
FIG. 11 is a top plan view of the structure of FIG. 9.

In FIG. 9, structured packing 102 in a further embodiment is formed of porous mesh MEC material and comprises an array of identical packing elements 104, 106, 108 and 110 which are part of a larger array 103, FIG. 11. This packing structure shows optional vortex generators of a novel configuration. While nine elements are shown in FIG. 11, this is by way of illustration, as in practice more or fewer elements may be used according to a given implementation. Also, the elements are shown in a square array. This configuration is also by way of illustration as a preferred embodiment. In practice, the array may also be rectangular, circular or any other desired shape in plan view, comparable to the view of FIG. 11, as desired for a given implementation.

The elements are housed in an outer tower housing 112 which in this case is square in transverse section. Other housings (not shown) may be rectangular or circular in transverse section, as shown for example in embodiments described hereinafter. Each element 104, 106, 108 and 110 is formed from an identical substrate blank 114, FIG. 13, of preferably composite porous metallic fibers as described hereinabove. The material is preferably formed from the material as described in the US patents noted in the introductory portion and hereinabove and which are incorporated by reference herein.

The blank 114 is a fragment of and represents a portion of a larger complete blank forming each of the elements of FIG. 11. The complete blank (not shown) appears as shown for the partial blank 114 with an identical repetition of the illustrated pattern extending to the right in the Figure (and according to a given implementation, may extend further vertically from the top to bottom of the figure).

Figure 13:
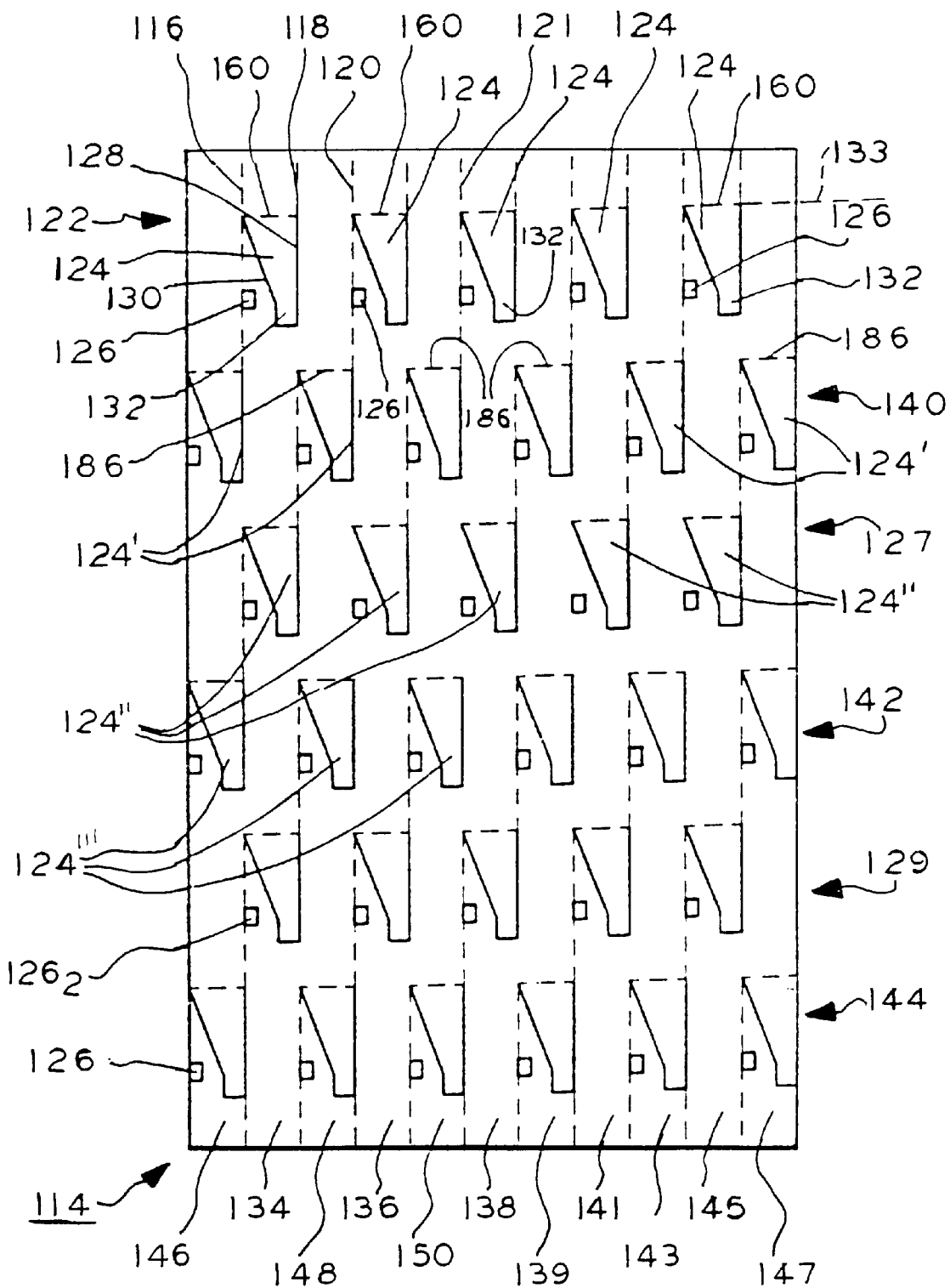
FIG. 13 is a front elevation view of a blank forming a packing element of the structure of FIG. 9.

In FIG. 13, the substrate blank 114 includes a plurality of optional through cuts represented by solid lines. Fold lines are illustrated by broken lines 116, 118, 120, 160 and so on. A first row 122 of identical tabs 124 and identical through holes 126 are formed with a tab 124 and hole 126 disposed between each of alternating pairs of adjacent fold lines, such as lines 116 and 118, 120 and 121 and so on. Tabs 124 eventually form vortex generators as will be described below herein. The holes 126 are adjacent the tip region of the tabs 124 and are located on a channel forming fold line at which the inclined edge 130 emanates. The same reference numerals with or without primes and multiple primes in the figures represent identical parts.

Each tab 124 has a first edge 128 coextensive with a channel forming fold line, such as line 118. The tab 124 has a second edge 130 which emanates at a second channel fold line such as fold line 116 inclined to the fold lines 116 and 118 terminating at a distal end segment tip 132. The edges 128 and 130 terminate at one end at tab fold line 160 along plane 133. The tip 132 has an edge that is coextensive with edge 128 both of which edges are straight and lie on a channel fold line, such as line 118.

The edges 128 and 130 both emanate from a common transverse plane 133 as do all of the edges of the tabs 124 of row 122. The tip 132, which is optional, preferably is square or rectangular for the purpose to be described, but may be other shapes as well according to a given implementation. Holes 126 are slightly larger than the tip 132 so as to permit a tip 132 of a tab 124 to pass therethrough in a manner to be explained. All of the tabs 124 and holes of row 122 are aligned parallel to plane 133.

Additional rows 127 and 129 of tabs 124 and holes 126 are aligned parallel to row 122 and are aligned in the same column such as column 134 between a given set of fold lines such as lines 116 and 118. The tabs 124 and holes 126 between fold lines 116 and 118 are aligned in column 134. The blank 114 as shown has alternating columns 136, 138 and so on corresponding to column 134 of tabs 124 and holes 126 which are aligned in the respective rows 127 and 129. More or fewer such rows and columns may be provided according to a given implementation.

The rows 122, 127 and 129 alternate with rows 140, 142 and 144 of tabs 124 and holes 126. The tabs 124 and holes 126 of rows 140, 142 and 144 are in the alternate columns 146, 148, 150 and so on. Consequently, the blank 114 has a plurality of rows and columns of the tabs 124 and holes 126 with the tabs of a given set of columns and rows alternating in vertical and horizontal position with the tabs and holes of the remaining columns and rows as shown.

Figure 10A:
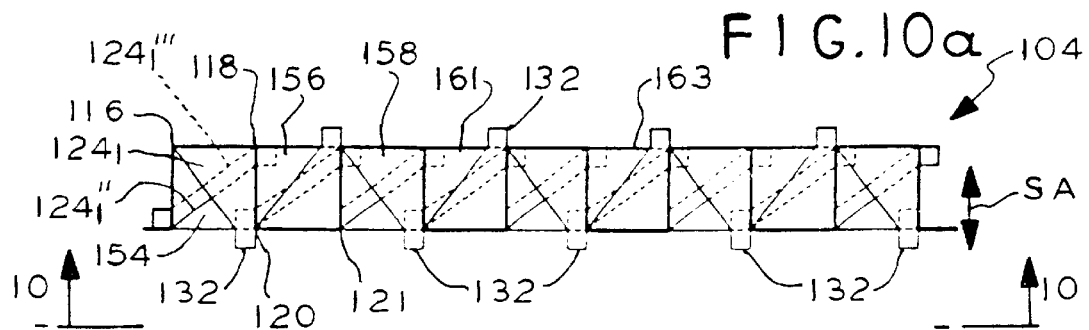
FIG. 10a is a top plan view of one of the packing elements of FIG. 9.
Figure 10:
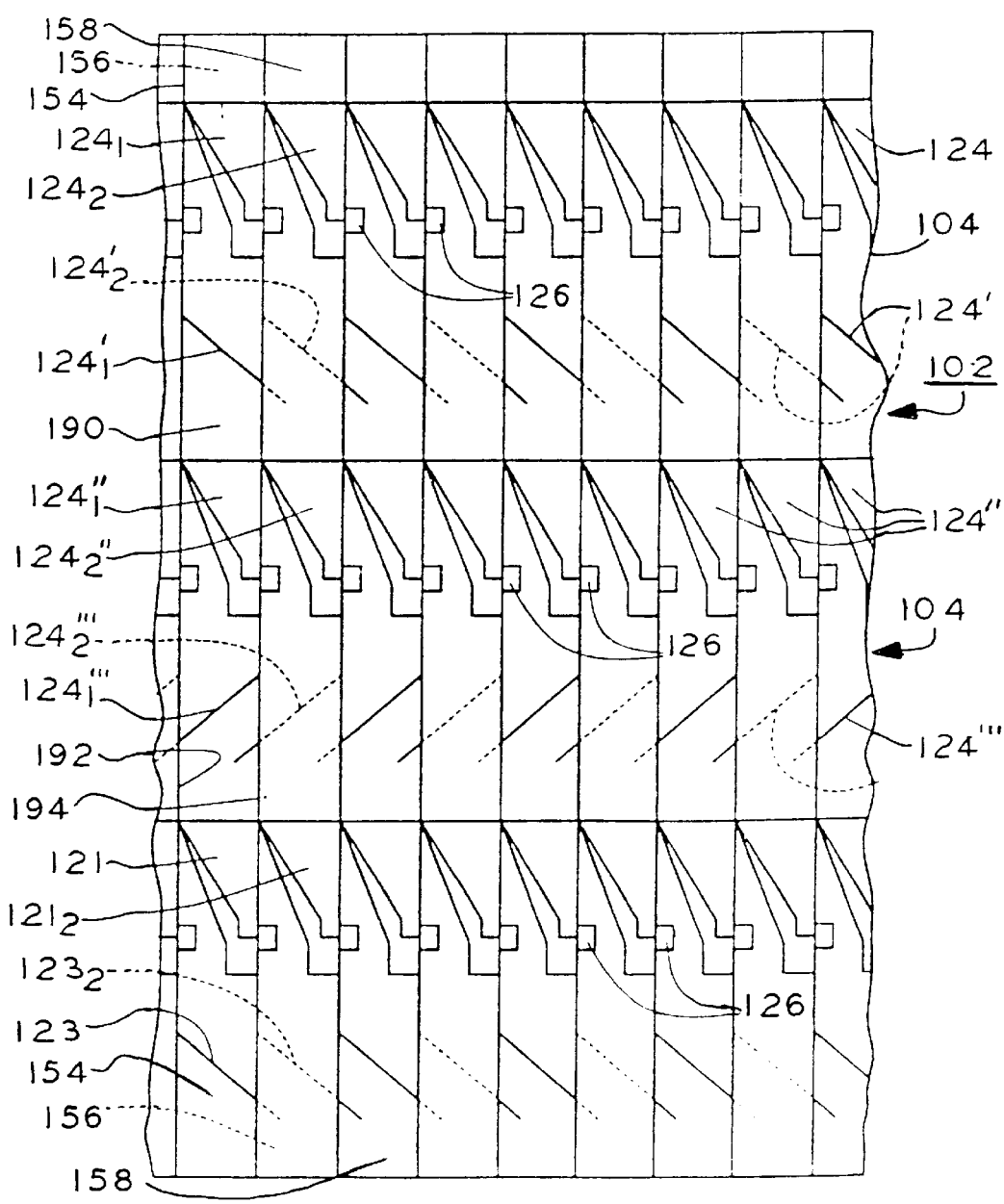
FIG. 10 is a front elevation view of the packing element of FIG. 10a taken along lines 10—10.

In FIGS. 10 and 10a, the element 1044, as are all of the elements, is formed by bending the blank substrate material along the fold lines 116, 118, 120, 121 and so on (FIG. 13) in alternating opposite directions. This forms the blank 114 into a channelized quasi-corrugated structure. The structure has identical preferably square in plan view channels 154, 156, 158 and so on. These channels face in alternating opposite directions 159 (FIG. 12). Thus channels 154, 158 and so on face toward the bottom of the figure, directions 159 and channels 156, 161, 163 and so on face in the opposite direction toward the top of the figure.

In FIG. 12, representative element 162 has channels 164, 166, 168, 170 each having a respective intermediate connecting wall 172, 174, 176 and 178 and so on lying in planes extending from left to right in the figure spaced in a normal direction. Channel 166 has lateral side walls 180 and 182 and channel 168 has lateral side walls 182 and 184 with wall 182 being in common for channels 166 and 168. The element 162 has further identical channels as seen in FIG. 11. All of the elements of packing 102 are constructed similarly with identical channels.

Prior to forming the channels or at the same time, the tabs 124, FIG. 13, are bent to extend from the plane of the blank 114 to form vortex generators at collinear fold lines 160 lying on plane 133.

The tabs 124 in row 122 are bent out of the plane of the figure in opposite directions in alternate columns 134, 136, 138 and so on. Thus the tabs of columns 134, 138, and 145 are bent in the same direction, e.g., out of the drawing plane toward the viewer. The tabs in columns 136 and 41 are bent in the opposite direction out of the plane of the figure away from the viewer. The same bending sequence is provided the tabs of rows 127 and 129 which are in the same columns as the tabs of row 122 so that the tabs of a given column are all bent in parallel directions.

The tabs 124' of the next row 140 in the adjacent alternate columns 146, 148, 150 and so on are all bent parallel in the same direction at corresponding collinear fold lines 186 parallel to plane 133 toward the viewer. They are also parallel to the tabs of columns 134, 138 and so on.

The tabs 124" of the next row 127 are bent at their respective fold lines in the same direction as the tabs 124' in row 127, e.g., toward the viewer out of the plane of the drawing. These tabs are parallel to the tabs of row 140.

The tabs 124''' of the row 142 are bent at their fold lines 188 in a direction opposite to the bend of the tabs of rows 127 and 140, e.g., in a direction out of the plane of the drawing away from the viewer. These tabs are parallel and bent in the same direction as the tabs in columns 136 and 141. The tabs of row 129 are bent in the same direction as the tabs of rows 122 and 127 in the same columns, repeating such bends. The tabs of row 144 are bent the same as the tabs of rows 142 and 140 toward the viewer.

In FIGS. 9 and 10, element 104 has a set of tabs $124_1$, $124_1'$, $124_1''$, $124_1'''$, 121 and 123 in channel 154. The tabs $124_1$, $124_1''$, and 121 all extend in the same direction, for example, from channel 154 connecting wall 190 into the channel 154. The tabs $124_1'$, and 123 extend from the same lateral side wall, e.g., side wall 192. The tab $124_1'''$, however, extends into channel 154 from the opposite lateral side wall 194. The tabs in plan view along the channel 154 length, from the top of the figure to the bottom, in FIGS. 9 and 10, interrupt the vertical channels and thus form a solely tortuous generally vertical path for fluids. No open continuous vertical linear fluid path is available along the channel lengths for any of the channels.

The tabs in the next opposite facing channel 156 are in mirror image orientation to the tabs of channel 154 as best seen in FIG. 10.

The tortuous blocking interruption of the vertical linear path by the tabs is best seen in FIG. 12a. Representative element 162 channel 166 has an uppermost tab $124_2$, a next lower tab $124_2'$ and then a still next lower tab $124_2''$ and so on. As shown, a portion of each of the tabs overlies a portion of the other tabs in the channel. In the plan view the channel 166 is totally blocked by the tabs, as are all of the channels, in the vertical direction normal to the plane of the figure. Thus no linear vertical fluid path is present along the length of the channel 166 (or channels 154, 156, 158 and so on in FIG. 10). Also, each tab in a given channel has one edge thereof adjacent to and abutting either a lateral side wall or a connecting wall.

The holes 126 each receive a tip 132 of a corresponding tab. For example, in FIG. 12, a tip $132_2$ of tab $124_2$ extends through a hole 126 into adjacent channel 196 of an adjacent element 1102. A tip $132_2'$ of tab $124_2'$ extends into adjacent channel 198 of element 162. A tip $132_2''$ of tab $124_2''$ extends into adjacent channel 1100 of element 162. The tab tips thus extend through the corresponding holes 126 of the channel thereof into a next adjacent channel for all of the tabs.

The tabs extending from an intermediate connecting wall, such as tab $124_2$, FIG. 12, attached to wall 174 of element 162, extend toward and pass through the hole 126 of the connecting wall of the adjacent packing element, such as wall 197 of element 1102. However, none of the tabs of element 1102 extend into or toward the channels of the element 162. Thus, the tabs of each element are employed for substantially cooperating with only the channels of that element to provide the desired tortuous fluid paths. The tabs of each element are substantially independent of the channels of the adjacent elements, notwithstanding that the tips 132 of the connecting wall tabs cooperate as described with the connecting walls and channels of the adjacent elements.

The tabs 124 and tips 132 are not bent away from the plane of the blank 114, FIG. 13 for those walls of the channels next adjacent to the housing, which walls abut the housing 112. Thus the tabs at the edges of the structure array 103, FIG. 11, do not extend beyond the structure so as to not interfere with the housing 112 interior walls. In the same manner, the tabs at the edge surfaces of the structure 103 are not bent beyond the plane of these surfaces as shown in FIG. 11. Holes 126 in these edge surfaces are also not necessary.

The tips 132 and holes 126 are optionally employed to provide drip flow of liquid to opposite sides of the respective channel walls to enhance fluid contact throughout the packing structure. Also, the use of vortex generators, cross communicating holes and the like are optional for the present invention.

The holes 126 also provide fluid communication among the channels in directions transverse the vertical axis of the structure array 103. Of course, the openings in the structured elements sheet material formed by bending the tabs out of the plane of the sheet material provide major fluid communication between the channels in a transverse direction. These openings and openings 126 may be formed in all four walls of each interior channel.

The elements of structure array 103, FIG. 11, such as elements 104, 106, 108, 110 and so on, are preferably secured together by spot welding the corners of the channels at the upper and bottom array 3 ends. The welding is optional as the elements may be dimensioned to fit closely into the tower housing 112 (FIG. 11) and held in place to the housing by friction or by other means (not shown) such as fasteners or the like. The elements may also be secured together first by any convenient fastening devices or bonding medium.

It should be understood that the number of tabs in a channel and their relative orientation is given by way of example. For example, only one tab, such as tab $124_1'''$ in channel 154 extends from the lateral side wall 194 into channel 154. In practice, more than one tab would extend from each side wall into each channel. Also, the sequence of tab orientation, e.g., which tabs extend from a given wall in a vertical sequence, is also by way of example, as other orientations may be used according to a given need.

Further, the vertical length of the elements and the packing array channels of the array 103 in practice may vary from that shown. The channel lengths are determined by the factors involved for a given implementation as determined by the type of fluids, volumes thereof, flow rates, viscosities and other related parameters required to perform the desired process as discussed hereinabove in more detail. The structure of FIGS. 9–13 is described further in the aforementioned PCT application PCT/US98/27699 incorporated in its entirety by reference herein.

Figure 14:
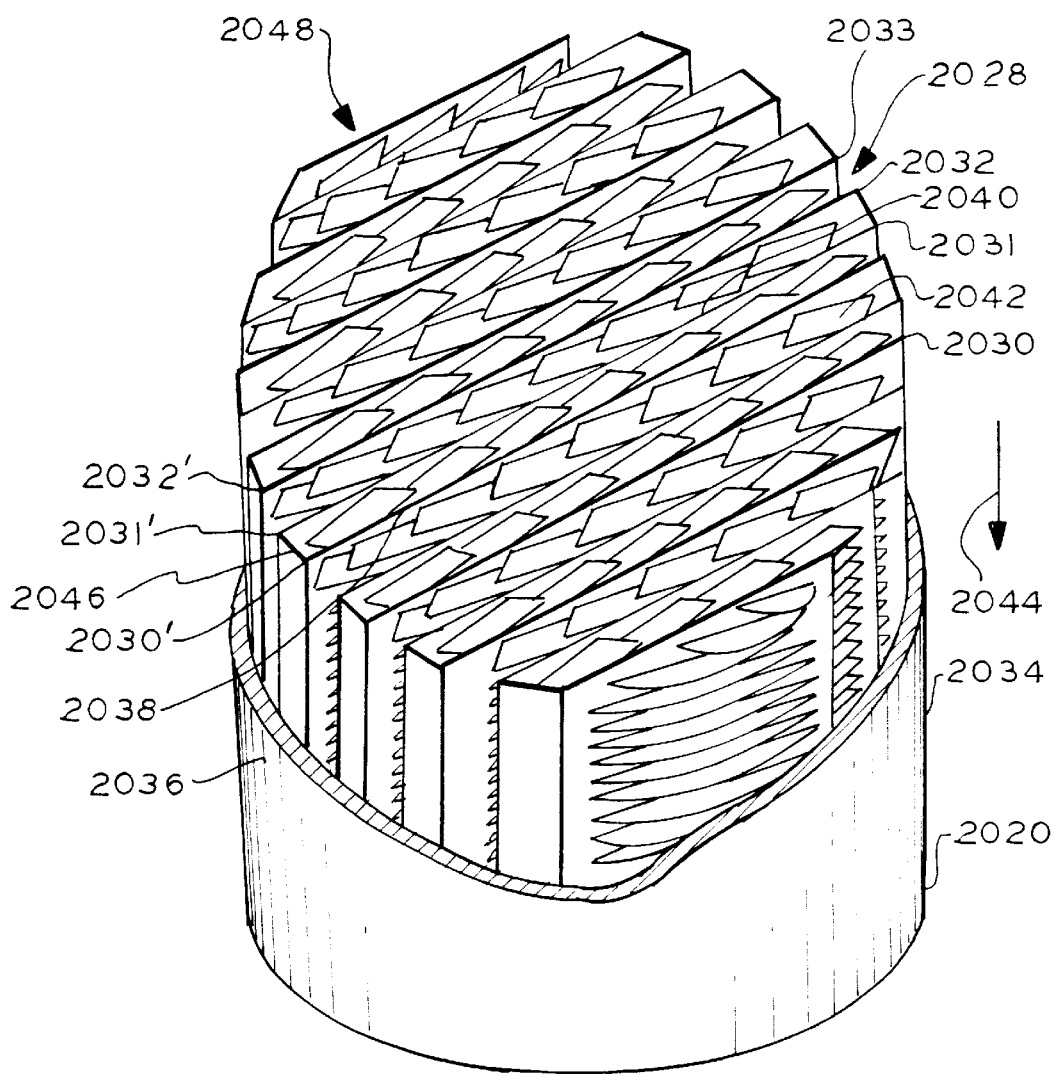
FIG. 14 is an isometric view of a packing module in accordance with a further embodiment.
Figure 15:
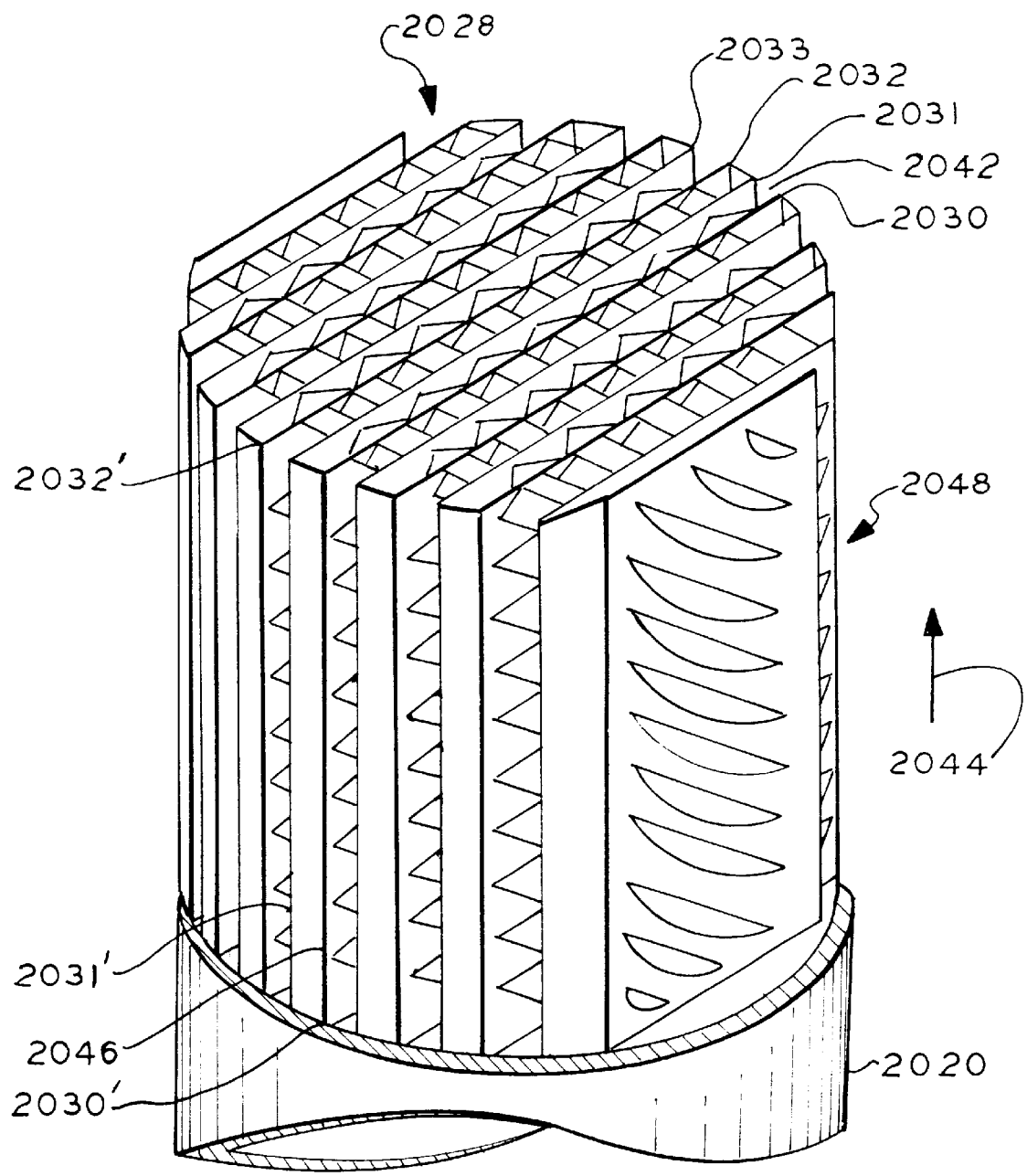
FIG. 15 is a further isometric view of the packing module of FIG. 14.
Figure 16:
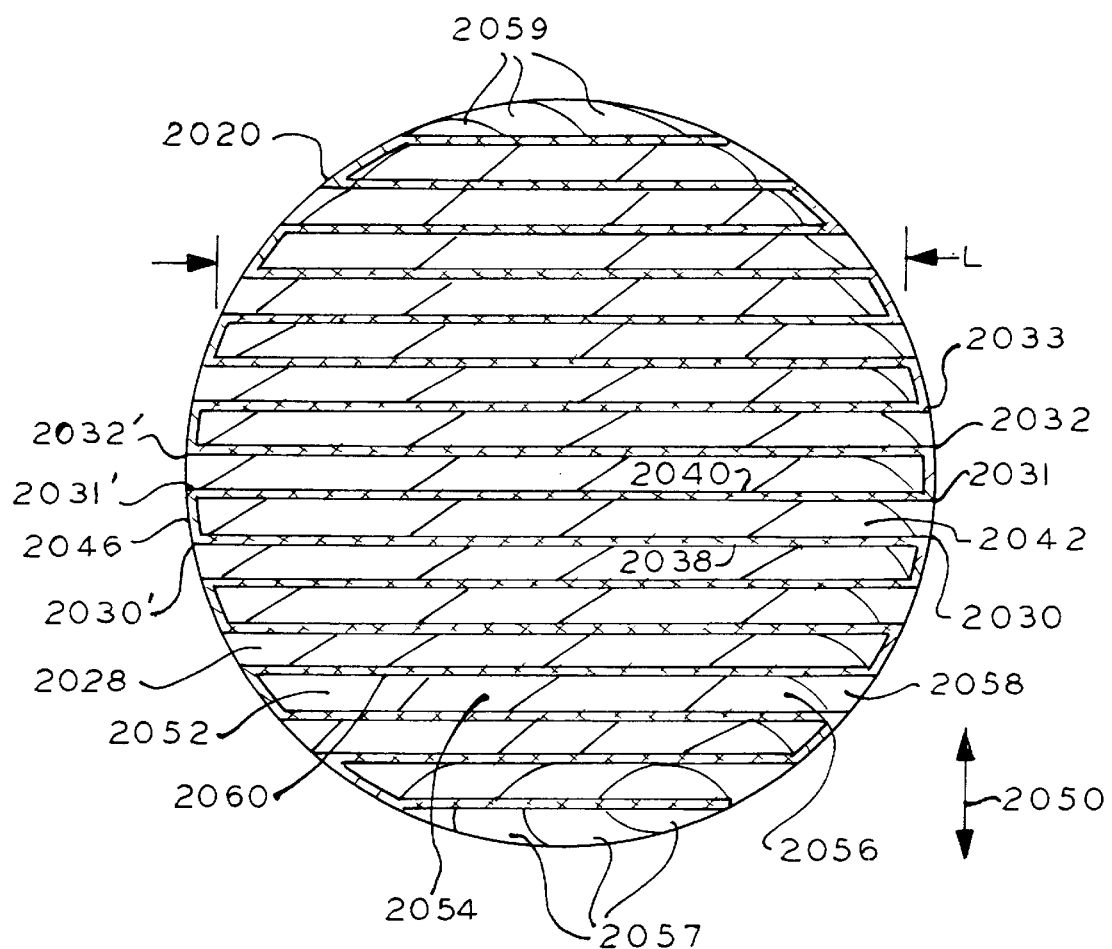
FIG. 16 is a top plan sectional view of the embodiment of FIG. 14 showing a packing module in a tube.

In FIGS. 14, 15 and 16, a catalyst support structure or heat transfer modular packing 2028, according to a given implementation, is placed axially in a tube 2020 for the length of the tube 2020. The packings 2028 each comprise a single one piece sheet of porous mesh or screen material made of metal or other fibers. The fiber material may also be ceramic, glass, carbon or any combination thereof. The modular packings 2028 are place in preferably abutting (or closely spaced relation) in the tube 202020 bore.

Representative modular packing 2028 comprises a single sheet of the porous mesh material. The mesh material, FIG. 16, is folded at fold lines 2030, 2031, 2033 and so on at one side 2034 of the packing 2028, and at fold lines 2030', 2031' and 2033' and so on at the opposite side of the 2036 tube 202020. Fold lines 2030, 2030' define a planar section 2038 therebetween of the flat planar sheet mesh material. Fold lines 2031, 2031' form an adjacent planar section 2040 of mesh material. Sections 2038 and 2040 form a fluid flow channel 2042 therebetween for fluid flowing nominally in direction 2044, FIG. 14. The actual direction of fluid flow in the tube is complex due to turbulence as will be described and also flows inclined transverse to the tube longitudinal axis defined by direction 2044.

The region between sections 2038 and 2040, by way of example, between fold lines 2030' and 2031' forms a generally rectangular intermediate tube interface 2046 which abuts the tube 2020 inner surface. The sections 2038 and 2048 which are representative of the orientation of the other sections in the packing 2028 are parallel and parallel to the other sections in the packing. As a result there is an array 2048 of parallel sections, each section terminating at a foldline forming an interface with the fold line of the adjacent section. The intermediate interfaces such as interface 2046 all abut an inner surface of the tube 2020 in preferable thermal conductive relation. The sections such as sections 2038 and 2040 and so on are all interconnected as a one piece structure separated by fold lines and an intermediate interface, such as interface 2046.

The array of sections such as sections 2038 and 2040 form a corresponding array of fluid channels such as channel 2042 which are all parallel of generally the same transverse width in directions 2050, FIG. 4. Located in each channel are turbulence generator vanes 2052, 2054 and 2056, for example in channel 2058. The vanes are all inclined at about 45° with respect to the fluid flow direction 2044 through the tube 2020, but may be inclined at other angles. The vanes redirect fluid impinging on the vanes transversely against the tube 2020 inner side wall surface to optimize heat transfer to the tube. The vanes 2052, 2054 and 2056 are just a few of the vanes attached to section. Other like vanes are in spaced alignment with the vanes 2053, 2054 and 2056 in the axial fluid flow direction 2044 of the tube 2020 in a vertical array. Either an interface or vane (at the edge of the packing such as vanes 2057 and 2059, FIG. 16) is in thermal conductive contact with the inner surface of tube 2020. The modular packing 2028 is thus a zig-zag structure folded in accordion fashion with somewhat rectangular channels formed by planar sections and intermediate interfaces. The intermediate interfaces are at angles to the plane of some of the sections so as to mate with corresponding curvature of the tube 2020 inner surface as shown in FIG. 4.

Figure 17:
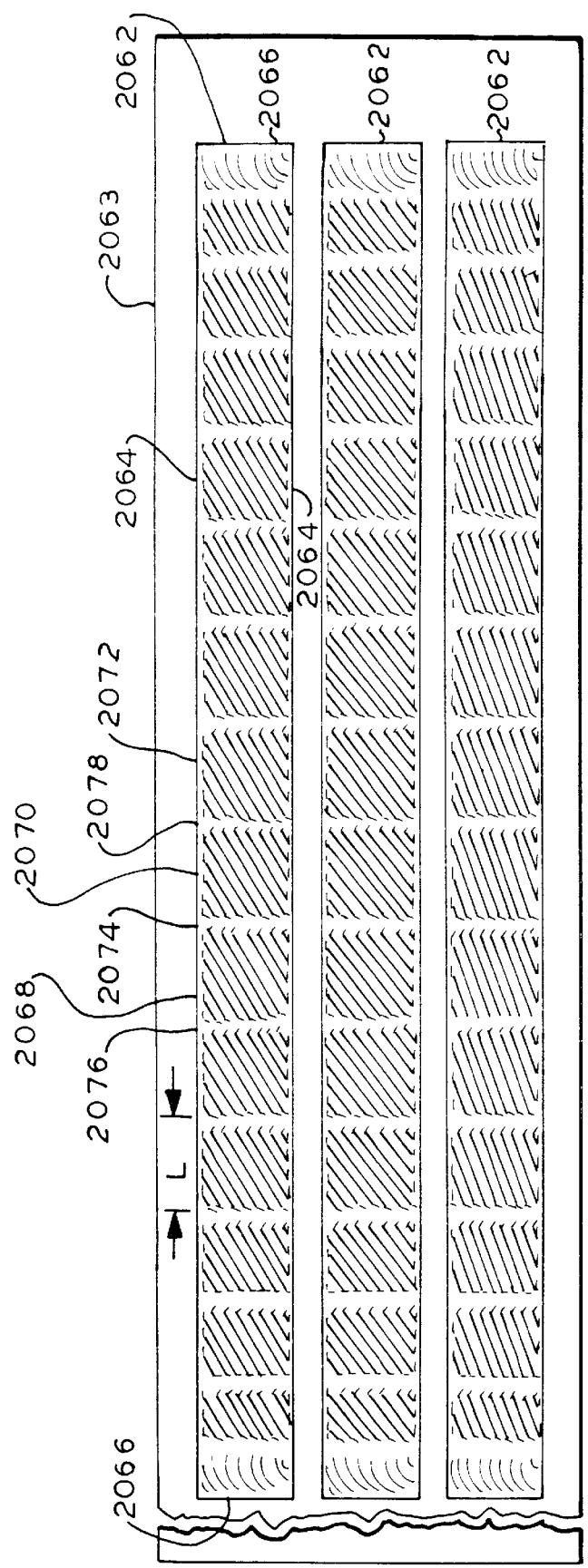
FIG. 17 is a plan view of a set of blanks used to make the modules of FIGS. 14 and 15.
Figure 18:
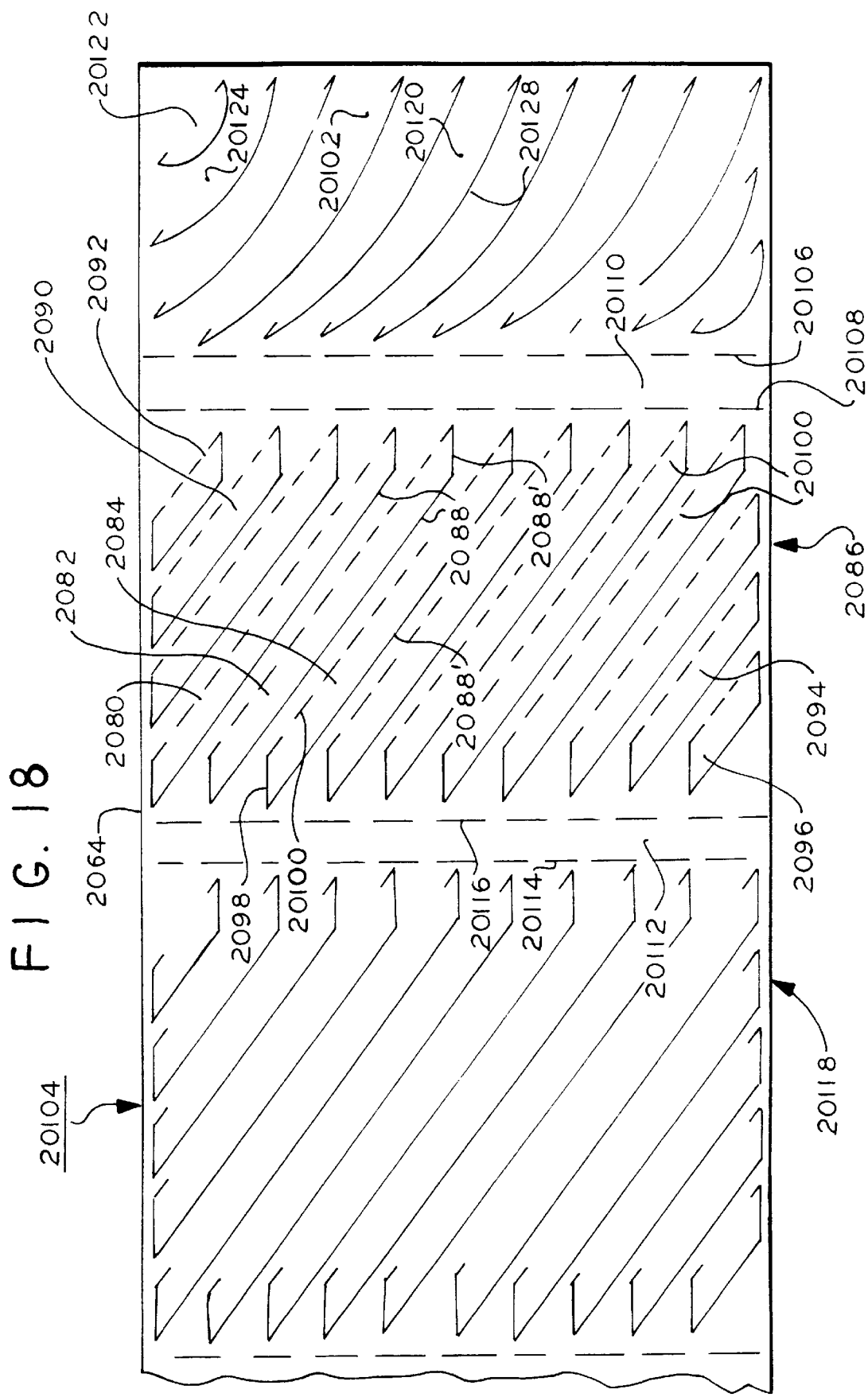
FIG. 18 is a more detailed view of a portion of one of the blanks of FIG. 17 illustrating the vane formation.
Figure 19:
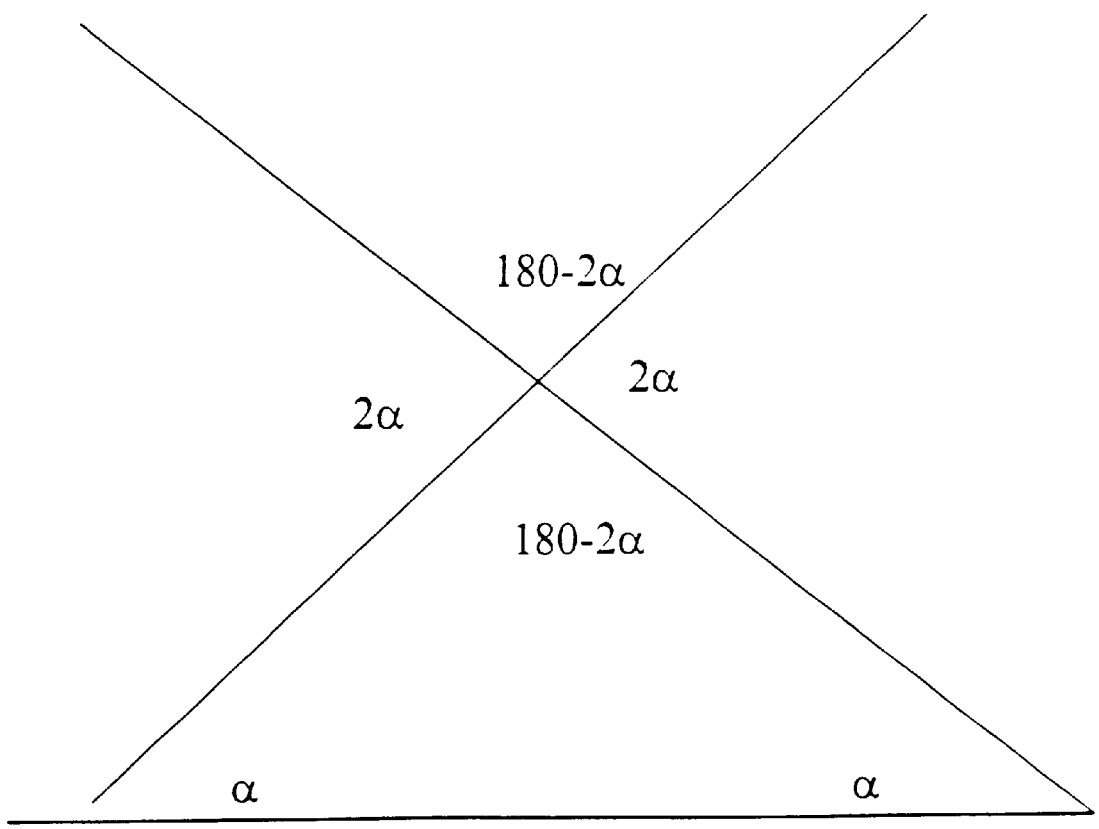
FIG. 19 is a diagram useful for explaining certain principles of the invention.

The configuration and layout of the vanes 2052, 2054, 2056 and so on is best illustrated in connection with FIGS. 17 and 18. In FIGS. 17 and 18, the orientation of the vanes are different, but the dimensioning of the vanes is the same for a given tube internal diameter as the relative orientation of the vanes is not critical for a given tube, the orientation of all of the modules preferably being the same in a corresponding tube. However, the orientation of the vanes, which may be about 45° to the longitudinal axis of the tube may also be different for a given set of modules in a tube according to a given implementation.

In FIG. 17, three identical rectangular blank sheets 2062, 2062' are formed of wire mesh from a blank 2063, the mesh material to be described below. Representative sheet 2062' is an elongated rectangular sheet of fiber mesh material having two parallel identical longitudinal edges 64 and parallel identical end edges 2066. Solid lines in the blank 2063 sheet represent through cuts. The blank sheet 2062' has a plurality of aligned sections 2068, 2070 and 2072 and so on in a linear array. The sections have different lengths L that corresponds to the transverse dimension across the tube 2020 internal diameter for that section (see FIG. 16). The interfaces are between each such section such as interfaces 2074, 2076 and 2078. The interfaces alternate on opposite sides of the tube 2020 as shown in FIG. 16. The vanes are formed by cuts 2088, FIG. 18, in section 20104 at 45° to the length dimension of the blank and sections from left to right in the figure.

As best seen in FIG. 18, in blank 20104 the vanes such as vanes 2080, 2082 and 2084 in representative section 2086 are identical and formed by through cuts 2088. Vanes 2090 and 2092 are shorter than vanes 2080, 2082 and 2084 as they are located in the corner of the section. The mirror image vanes 2094 and 2096 in the diagonal opposite corner of section 86 are the same as vanes 2090 and 2092, but in the alternative may differ from each other according to a given implementation.

Cut 2088 has a straight portion 2088' and an angled cut 2088" at one end of the cut and a U-shaped cut 2098 in conjunction with cut 2088'. Representative vane 2084 has a fold line 20100 shown by the dashed line. The fold lines for the vanes in the other sections are not shown by dashed lines, but are intended to be included. The fold lines for all of the central sections in blank 20104 excluding the two opposite end sections such as section 20102 are parallel to fold line 20100.

The sections are each separated by two fold lines such as fold lines 20106 and 20108 between sections 2086 and 20102. Sections 20106 and 20108 form intermediate interface 20110 therebetween. A further intermediate interface 20112 is between fold lines 20114 and 20116 of respective sections 20118 and 2086 and so on.

The vanes of end section 20102 are different then the vanes intermediate the end sections. The vanes 20120, 20122, 20124, 20126 and so on of the end section 102 are thinner in transverse width, and have curved external edges 20128. These vanes directly abut the inner surface of the tube and therefore have curvatures that match the curvature of the curved inner surface of the tube 2020. These end section vanes correspond in location to vanes 2054, 2057, for example, in FIG. 16, modular packing 2028. It should be understood that the drawings are not to scale and are generally schematic in nature to explain the principles rather than provide exact dimensional relation of the different elements of the packing and tube 2020.

Because the vanes of the different modular packings 2028, FIGS. 14–16, are inclined generally at 45° to the longitudinal axis of the tube 2020, these vanes all direct fluid against the inner surface of the tube wall to maximize heat transfer from the interior of the sections to the tube. The vanes also create local pressure differentials, i.e., turbulence, which may maximize fluid flow through the mesh of the substrate material forming the modular packing 2028 as will be described in more detail herein. The mesh material because of the small pore size normally does not exhibit fluid flow therethrough when the pressure differential thereacross on opposite surfaces is about the same or a small value.

The size and spacing of the openings in the mesh material of the sections, preferably in combination with the vane turbulence generators, are optionally selected to obtain a desired bulk mixing and pressure drop through the mesh of the structured packing, although such openings and generators are not necessary for the present embodiment.

The invention now will be described with respect to the following examples; however, the scope of the present invention is not intended to be limited thereby.

EXAMPLE 1

γ-alumina with a surface area of 200 m$^2$/g was wet milled with deionized water to obtain a slurry of γ-alumina. The slurry solids content of this slurry was 20% by wt. and the average particle size in the slurry was about 1 micron. The MEC structure was heat treated at 325° C. for 1 h. The γ-alumina was coated on the MEC structure by immersing the MEC structure in the γ-alumina slurry. The MEC structure was removed from the slurry after 1 min and the excess slurry on the structure was removed using an air-knife. The structure was then dried in a forced air convection oven at 120° C. for 2 h and then calcined at 500° C. for 2 h. The platinum impregnation on the γ-alumina coated MEC structure was carried out by immersing this structure in an aqueous solution of a known concentration of platinum (II) nitrate. The immersion was carried out for 24 h to allow almost complete deposition of all the platinum ions from the aqueous solution on to the γ-alumina coated MEC structure. The structure was then dried in a forced air convection oven at 120° C. for 2 h and then calcined at 500° C. for 2 h, to prepare the highly dispersed Pt/γ-alumina-catalyst for the oxidation of the environmentally harmful compounds. The platinum loading on the γ-alumina was 1% by wt.

EXAMPLE 2

γ-alumina powder with a surface area of 200 m²/g and a particle size of 300 microns was impregnated with an aqueous solution of a known concentration of platinum (II) nitrate, by incipient wetness. The powder was then dried in a forced air convection oven at 120° C. for 2 h. After drying, the dried platinum/γ-alumina powder was calcined at 500° C. for 2 h, to prepare a highly dispersed Pt/γ-alumina catalyst powder. The platinum loading on the γ-alumina was 1% by wt. This powder was wet milled with deionized water in an Eiger mill to prepare a slurry containing 20% by wt of this Pt/γ-alumina catalyst powder. The particle size of the solids in the slurry was in the range of 1–3 microns. To this slurry, 1% (based on the weight of the solids in the slurry) alumina sol was added.

The MEC structure was heat treated at 325° C. for 1 h. The platinum catalyst was coated on the MEC structure by immersing the MEC structure in the Pt/γ-alumina catalyst slurry. The MEC structure was removed from the slurry after 1 min and the excess slurry on the structure was removed using an air-knife. The structure was then dried in a forced air convection oven at 120° C. for 2 h and then calcined at 500° C. for 2 h.

The various embodiments discussed above disclose support structures with and without vortex generators. Generally the carbonaceous emissions may result from flue gases and the like which have relatively low velocity. In other cases the emissions may have relatively high velocities. Vortex generators are most effective in high velocity gas streams. In any case, the MEC material discussed hrerein-above has relatively small pore size and thus a pressure differential thereacross promotes fluid flow through the pores from one side to the other side of the material.

Vortex generators in a high velocity gas flow thus create higher pressure differentials across the MEC support material and are preferred in those implementations. In low flow velocity gases such as in flues and the like, vortex generators may not add significant pressure differentials to those already present in the gas stream and therefore may not be needed. Regardless, flow is promoted through the material by the pressure differentials that are present by the existing pressure differentials or by diffusion. Providing enhanced pressure differentials across the MEC material is preferred where possible to promote flow through the material across the entire surface of the material and depends upon a given implementation.

The disclosures of all publications, including patents and published patent applications, are herein incorporated by reference to the same extent as if each publication were specifically and individually incorporated herein by reference.

It is to be understood, however, that the scope of the present invention is not to be limited to the specific embodiments described above. The invention may be practiced other than as particularly described and still be within the scope of the accompanying claims.

What is claimed is:

1. A process for removing environmentally harmful compounds from a fluid, in particular a gas, comprising:
    forming a substrate comprising a randomly oriented mesh-like fibrous porous material having opposing sides, the material for promoting contact between fluids flowing over the surfaces of the material at the opposing sides, the material having pores exhibiting a range of sizes from sub-micron to no greater than about 500 microns, the pores having a plurality of interstices in communication with each other and externally the material, the material being arranged to create turbulence in the fluid flowing adjacent to said sides which turbulence creates a pressure differential across the material for promoting the flow of the flowing fluid from one side to the other side through the pores and interstices essentially over the entire surface of the material; and
    oxidizing the environmentally harmful compounds in the fluid in the presence of an oxidizing catalyst supported on the material, the catalyzed mesh-like structure having a porosity of greater than about 65%.

2. The process of claim 1 wherein said catalyzed mesh-like structure has a porosity of greater than 80%.

3. The process of claim 1 wherein said environmentally harmful compounds include volatile organic compounds (VOC) including hydrocarbons, CO and any other constituent that participates in atmospheric photochemical reactions to produce for example ozone or smog constituents, combustible compounds to be removed from a gas stream for reasons of toxicity, photochemical reactivity or physical discomfort such as irritants, particulates, odor sources, compounds which may cause upper atmosphere ozone depletion or lower atmosphere ozone formation and any organic compound which participates in atmospheric photochemical reactions excluding carbon dioxide, carbonic acid, metallic carbides or carbonates, and ammonium carbonate.

4. The process of claim 1 wherein the fibrous material comprises a plurality of fibers, including coating the catalyst on the fibers and also depositing catalytic material at the intersection of the fibers.

5. The process of claim 4 wherein the coating step includes coating the catalyst to a thickness less than 80 microns.

6. The process of claim 1 wherein the environmentally harmful compounds include any compound of carbon excluding carbon dioxide, carbonic acid, metallic carbides or carbonates and ammonium carbonate.

7. The process of claim 1 including forming the substrate of metal fibers.

8. The process of claim 1 including forming the substrate of ceramic fibers.

* * * * *